United States Patent
Li et al.

(10) Patent No.: US 11,861,762 B2
(45) Date of Patent: Jan. 2, 2024

(54) GENERATING SYNTHESIZED DIGITAL IMAGES UTILIZING CLASS-SPECIFIC MACHINE-LEARNING MODELS

(71) Applicant: Adobe Inc., San Jose, CA (US)

(72) Inventors: Yuheng Li, Davis, CA (US); Yijun Li, Seattle, WA (US); Jingwan Lu, Santa Clara, CA (US); Elya Shechtman, Seattle, WA (US); Krishna Kumar Singh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 105 days.

(21) Appl. No.: 17/400,474

(22) Filed: Aug. 12, 2021

(65) Prior Publication Data

US 2023/0051749 A1 Feb. 16, 2023

(51) Int. Cl.
*G06T 11/00* (2006.01)

(52) U.S. Cl.
CPC .......... *G06T 11/00* (2013.01); *G06T 2210/12* (2013.01)

(58) Field of Classification Search
CPC .............................. G06T 11/00; G06T 2210/12
See application file for complete search history.

(56) References Cited

U.S. PATENT DOCUMENTS

| | | | |
|---|---|---|---|
| 10,049,308 B1 * | 8/2018 | Dhua | G06K 9/6256 |
| 10,216,766 B2 | 2/2019 | Lin et al. | |
| 10,740,647 B2 | 8/2020 | Du et al. | |
| 11,126,890 B2 | 9/2021 | Lin et al. | |
| 2016/0314600 A1 * | 10/2016 | Nguyen | G06T 7/0012 |
| 2018/0130207 A1 * | 5/2018 | Anderson | G06N 20/10 |
| 2019/0220977 A1 * | 7/2019 | Zhou | G06K 9/6267 |
| 2021/0004589 A1 * | 1/2021 | Turkelson | G06V 10/82 |
| 2021/0042558 A1 * | 2/2021 | Choi | G06T 11/60 |

(Continued)

OTHER PUBLICATIONS

Hong et al; "Inferring Semantic Layout for Hierarchical Text-to-Image Synthesis"; Jun. 2018; 2018 IEEE/CVF Conference on Computer Vision and Pattern Recognition; pp. 7986-7994 (Year: 2018).*

(Continued)

*Primary Examiner* — Matthew Salvucci
(74) *Attorney, Agent, or Firm* — Keller Preece PLLC

(57) ABSTRACT

This disclosure describes methods, non-transitory computer readable storage media, and systems that generate synthetized digital images using class-specific generators for objects of different classes. The disclosed system modifies a synthesized digital image by utilizing a plurality of class-specific generator neural networks to generate a plurality of synthesized objects according to object classes identified in the synthesized digital image. The disclosed system determines object classes in the synthesized digital image such as via a semantic label map corresponding to the synthesized digital image. The disclosed system selects class-specific generator neural networks corresponding to the classes of objects in the synthesized digital image. The disclosed system also generates a plurality of synthesized objects utilizing the class-specific generator neural networks based on contextual data associated with the identified objects. The disclosed system generates a modified synthesized digital image by replacing the identified objects in the synthesized digital images with the synthesized objects.

20 Claims, 14 Drawing Sheets

(56) References Cited

U.S. PATENT DOCUMENTS

| | | | |
|---|---|---|---|
| 2021/0110588 A1* | 4/2021 | Adamson, III | G06V 10/764 |
| 2021/0118129 A1* | 4/2021 | Kearney | A61B 6/5217 |
| 2021/0216817 A1* | 7/2021 | Sommerlade | G06V 20/00 |
| 2021/0358123 A1* | 11/2021 | Kearney | G16H 30/20 |
| 2021/0358604 A1* | 11/2021 | Kearney | G06N 3/0445 |
| 2021/0397811 A1* | 12/2021 | Richter | H04N 21/4627 |
| 2022/0083807 A1* | 3/2022 | Zhang | G06N 3/088 |
| 2022/0126864 A1* | 4/2022 | Moustafa | B60W 60/001 |
| 2022/0138913 A1* | 5/2022 | Huang | H04N 5/232933 348/241 |

OTHER PUBLICATIONS

Tang et al; "Local Class-Specific and Global Image-Level Generative Adversarial Networks for Semantic-Guided Scene Generation"; Jun. 19, 2020; 2020 IEEE/CVF Conference on Computer Vision and Pattern Recognition; pp. 7867-7876 (Year: 2020).*

Zhu et al; "Semantically Multi-modal Image Synthesis"; Jun. 19, 2020; 2020 IEEE/CVF Conference on Computer Vision and Pattern Recognition; pp. 5466-5475 (Year: 2020).*

Tang et al; "Dual Attention GANs for Semantic Image Synthesis"; Oct. 16, 2020; 2020 Association for Computing Machinery; pp. 1994-2002 (Year: 2020).*

Martin Arjovsky, Soumith Chintala, and Leon Bottou. Wasserstein gan. ICML, 2017.

Xavier Puig, Tete Xiao, Sanja Fidler, Adela Barriuso, Antonio Torralba, Bolei Zhou, Hang Zhao. Scene parsing through ade20k dataset. In CVPR, 2017.

Andrew Brock, Jeff Donahue, and Karen Simonyan. Large scale GAN training for high fidelity natural image synthesis. In ICLR, 2019.

Xi Chen, Yan Duan, Rein Houthooft, John Schulman, Ilya Sutskever, and Pieter Abbeel. Infogan: Interpretable representation learning by information maximizing generative adversarial nets. In NeurIPS, 2016.

Marius Cordts, Mohamed Omran, Sebastian Ramos, Timo Rehfeld, Markus Enzweiler, Rodrigo Benenson, Uwe Franke, Stefan Roth, and Bernt Schiele. The cityscapes dataset for semantic urban scene understanding. In CVPR, 2016.

CVPR-FGVC5. https://www.kaggle.com/c/imaterialist-challenge-furniture-2018. 2018.

Max Welling, Diederik P Kingma. Auto-encoding variational bayes. In ICLR, 2014.

Ian Goodfellow. NeurIPS 2016 tutorial: Generative adversarial networks. arXiv preprint arXiv:1701.00160, 2016.

Ian Goodfellow, Jean Pouget-Abadie, Mehdi Mirza, Bing Xu, David Warde-Farley, Sherjil Ozair, Aaron Courville, and Yoshua Bengio. Generative adversarial nets. In NeurIPS, 2014.

Shuyang Gu, Jianmin Bao, Hao Yang, Dong Chen, Fang Wen, and Lu Yuan. Mask-guided portrait editing with conditional gans. In CVPR, 2019.

Ishaan Gulrajani, Faruk Ahmed, Martin Arjovsky, Vincent Dumoulin, and Aaron C Courville. Improved training of wasserstein gans. In NeurIPS, 2017.

Martin Heusel, Hubert Ramsauer, Thomas Unterthiner, Bernhard Nessler, Gunter Klambauer, and Sepp Hochreiter. Gans trained by a two time-scale update rule converge to a local nash equilibrium. In NeurIPS, 2017.

Tobias Hinz, Stefan Heinrich, and Stefan Wermter. Generating multiple objects at spatially distinct locations. In ICLR, 2019.

Rui Huang, Shu Zhang, Tianyu Li, and Ran He. Beyond face rotation: Global and local perception gan for photorealistic and identity preserving frontal view synthesis. In ICCV, 2017.

Phillip Isola, Jun-Yan Zhu, Tinghui Zhou, and Alexei Efros. Image-to-image translation with conditional adversarial networks. In CVPR, 2017.

Justin Johnson, Alexandre Alahi, and Li Fei-Fei. Perceptual losses for real-time style transfer and super-resolution. In ECCV, 2016.

Justin Johnson, Agrim Gupta, and Li Fei-Fei. Image generation from scene graphs. In CVPR, 2018.

Tero Karras, Timo Aila, Samuli Laine, and Jaakko Lehtinen. Progressive growing of gans for improved quality, stability, and variation. ICLR, 2018. Part 1.

Tero Karras, Timo Aila, Samuli Laine, and Jaakko Lehtinen. Progressive growing of gans for improved quality, stability, and variation. ICLR, 2018. Part 2.

Tero Karras, Samuli Laine, and Timo Aila. A style-based generator architecture for generative adversarial networks. In CVPR, 2019.

Cheng-Han Lee, Ziwei Liu, Lingyun Wu, and Ping Luo. Maskgan: Towards diverse and interactive facial image manipulation. InIEEE Conference on Computer Vision and Pattern Recognition (CVPR), 2020.

Kathleen M Lewis, Srivatsan Varadharajan, and Ira Kemelmacher-Shlizerman. Vogue: Try-on by stylegan interpolation optimization. arXiv preprint arXiv:2101.02285.

Peipei Li, Yibo Hu, Qi Li, Ran He, and Zhenan Sun. Global and local consistent age generative adversarial networks. In CVPR, 2018.

Tsung-Yi Lin, Piotr Dollar, Ross Girshick, Kaiming He, Bharath Hariharan, and Serge Belongie. Feature pyramid networks for object detection. In CVPR, 2017.

Takeru Miyato and Masanori Koyama. cgans with projection discriminator. In ICLR, 2018.

Taesung Park, Ming-Yu Liu, Ting-Chun Wang, and Jun-Yan Zhu. Semantic image synthesis with spatially-adaptive normalization. InCVPR, 2019.

Zhu, Peihao et al; Sean: Image synthesis with semantic region-adaptive normalization. In CVPR, 2020. Part 1.

Zhu, Peihao et al; Sean: Image synthesis with semantic region-adaptive normalization. In CVPR, 2020. Part 2.

Bernt Schiele, Pietro Perona, Piotr Dollar, Christian Wojek. Pedestrian detection: A benchmark. InCVPR, 2009.

Kripasindhu Sarkar, Vladislav Golyanik, Lingjie Liu, and Christian Theobalt. Style and pose control for image synthesis of humans from a single monocular view. In ArXiv:2102.11263, 2021.

K. Simonyan and A. Zisserman. Very Deep Convolutional Networks for Large-Scale Image Recognition. In ICLR, 2015.

Krishna Kumar Singh, Utkarsh Ojha, and Yong Jae Lee. FineGAN: Unsupervised hierarchical disentanglement for fine-grained object generation and discovery. In CVPR, 2019.

Vadim Sushko, Edgar Schonfeld, Dan Zhang, Juergen Gall, Bernt Schiele, and Anna Khoreva. You only need adversarial supervision for semantic image synthesis. InICLR, 2021.

Hao Tang, Dan Xu, Yan Yan, Philip H. S. Torr, and Nicu Sebe. Local class-specific and global image-level generative adversarial networks for semantic-guided scene generation. In CVPR, 2020.

Miika Aittala, Janne Hellsten, Jaakko Lehtinen, Timo Aila, Tero Karras, Samuli Laine. Analyzing and improving the image quality of stylegan. In CVPR, 2020.

Ting-Chun Wang, Ming-Yu Liu, Jun-Yan Zhu, Andrew Tao, Jan Kautz, and Bryan Catanzaro. High-resolution image synthesis and semantic manipulation with conditional gans. In CVPR, 2018.

Yuxin Wu, Alexander Kirillov, Francisco Massa, Wan-Yen Lo, and Ross Girshick. Detectron2. https://github.com/facebookresearch/detectron2, 2019.

Jing Shao, Xiaogang Wang, Hongsheng Li, Xihui Liu, Guojun Yin. Learning to predict layout-to-image conditional convolutions for semantic image synthesis. In NeurIPS, 2019.

Jianwei Yang, Anitha Kannan, Dhruv Batra, and Devi Parikh. Lr-gan: Layered recursive generative adversarial networks for image generation.ICLR, 2017.

Han Zhang, Tao Xu, Hongsheng Li, Shaoting Zhang, and Dimitris Metaxas. Stackgan: Text to photo-realistic image synthesis with stacked generative adversarial networks. In ICCV, 2017.

Bolei Zhou, Agata Lapedriza, Aditya Khosla, Aude Oliva, and Antonio Torralba. Places: A 10 million image database for scene recognition.PAMI, 2017.

Jun-Yan Zhu, Taesung Park, Phillip Isola, and Alexei A. Efros. Unpaired image-to-image translation using cycle-consistent adversarial networks.ICCV, 2017.

(56) References Cited

OTHER PUBLICATIONS

Abdal, Rameen et al. "Image2StyleGAN: How to Embed Images Into the StyleGAN Latent Space?" 2019 IEEE/CVF International Conference on Computer Vision (ICCV) (2019): 4431-4440. Part 1.
Abdal, Rameen et al. "Image2StyleGAN: How to Embed Images Into the StyleGAN Latent Space?" 2019 IEEE/CVF International Conference on Computer Vision (ICCV) (2019): 4431-4440. Part 2.
Abdal, Rameen et al. "Image2StyleGAN: How to Embed Images Into the StyleGAN Latent Space?" 2019 IEEE/CVF International Conference on Computer Vision (ICCV) (2019): 4431-4440. Part 3.
Abdal, Rameen et al. "Image2StyleGAN: How to Embed Images Into the StyleGAN Latent Space?" 2019 IEEE/CVF International Conference on Computer Vision (ICCV) (2019): 4431-4440. Part 4.
Abdal, R., Qin, Y., & Wonka, P. (2020). Image2StyleGAN++: How to Edit the Embedded Images? In 2020 IEEE/CVF Conference on Computer Vision and Pattern Recognition (CVPR) IEEE. https://doi.org/10.1109/CVPR42600.2020.00832. Part 1.
Abdal, R., Qin, Y., & Wonka, P. (2020). Image2StyleGAN++: How to Edit the Embedded Images? In 2020 IEEE/CVF Conference on Computer Vision and Pattern Recognition (CVPR) IEEE. https://doi.org/10.1109/CVPR42600.2020.00832. Part 2.
Abdal, R. et al.; StyleFlow: Attribute-conditioned Exploration of StyleGAN-Generated Images using Conditional Continuous Normalizing Flows; ACM Transactions on Graphics vol. 40 Issue Jun. 3, 2021 Article No. 21pp. 1-21 https://doi.org/10.1145/3447648; Published May 6, 2021; Part 1.
Abdal, R. et al.; StyleFlow: Attribute-conditioned Exploration of StyleGAN-Generated Images using Conditional Continuous Normalizing Flows; ACM Transactions on Graphics vol. 40 Issue Jun. 3, 2021 Article No. 21pp 1-21 https://doi.org/10.1145/3447648; Published May 6, 2021; Part 2.
Abdal, R. et al.; StyleFlow: Attribute-conditioned Exploration of StyleGAN-Generated Images using Conditional Continuous Normalizing Flows; ACM Transactions on Graphics vol. 40 Issue Jun. 3, 2021 Article No. 21pp. 1-21 https://doi.org/10.1145/3447648; Published May 6, 2021.

\* cited by examiner

GENERATING SYNTHESIZED DIGITAL IMAGES UTILIZING CLASS-SPECIFIC MACHINE-LEARNING MODELS

BACKGROUND

Advances in computer processing and machine learning have led to significant advancements in the field of digital image processing and generation. Specifically, machine-learning models and neural networks provide many different types of systems the ability to generate synthesized digital images to imitate real-world images. For example, many systems utilize synthetic images to augment image databases to use for improving machine-learning models. Because the content of digital images in image training datasets has such a significant impact on the accuracy and performance of machine-learning models, ensuring that synthetically generated digital images accurately represent the intended content is an important aspect of image dataset augmentation.

Some existing image generation systems utilize generation neural networks (e.g., generative adversarial networks) to generate synthesized digital images in conditional settings. Specifically, these image generation systems generate images based on an input conditioning signal such as another image, a segmentation map, or other prior. For example, some existing image generation systems utilize a conditional generative adversarial network with spatially-adaptive normalization to generate synthesized digital images. While such systems improve image quality during semantic image generation, the resulting quality is still inferior to the quality of unconditional generative adversarial networks. Additionally, these existing systems also typically generate synthesized digital images with limited resolution sizes that are not useful for real-world applications.

SUMMARY

This disclosure describes one or more embodiments of methods, non-transitory computer readable media, and systems that solve the foregoing problems (in addition to providing other benefits) by generating synthetized digital images using class-specific generators for objects of different classes. The disclosed systems modify a synthesized digital image by utilizing a plurality of class-specific generator neural networks to generate a plurality of objects according to classes of objects identified in the synthesized digital image. More specifically, the disclosed systems determine classes of objects in the synthesized digital image such as via a semantic label map corresponding to the synthesized digital image. Additionally, the disclosed systems select class-specific generator neural networks corresponding to the classes of objects in the synthesized digital image. The disclosed systems generate a plurality of synthesized objects utilizing the class-specific generator neural networks based on cropped portions of the synthesized digital image including contextual data associated with the identified objects. The disclosed systems then replace the identified objects in the synthesized digital images with the synthesized objects to produce a synthesized digital image with more accurate details for the individual objects.

BRIEF DESCRIPTION OF THE DRAWINGS

The detailed description refers to the drawings briefly described below.

DETAILED DESCRIPTION

Figure 1:
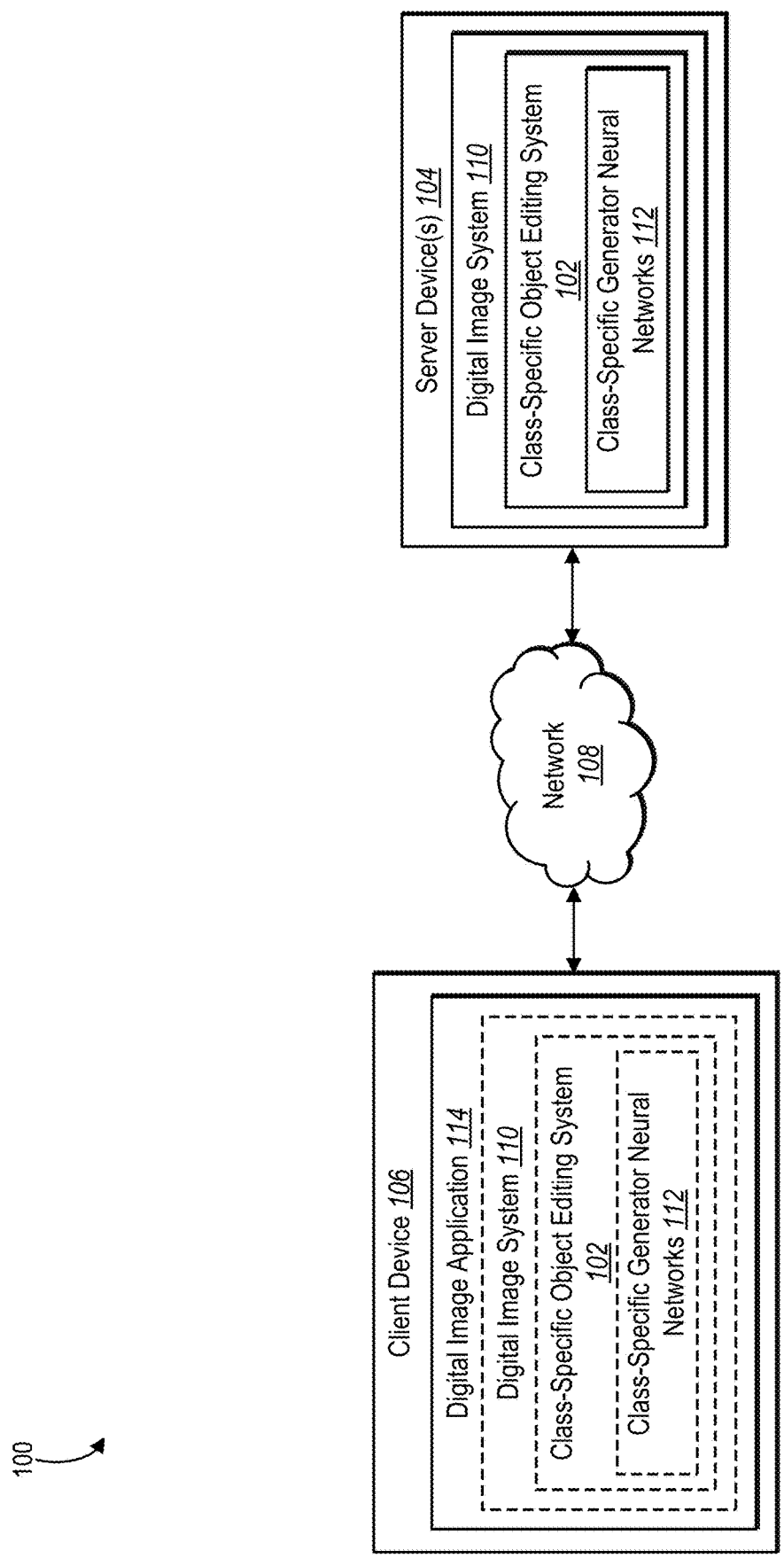
FIG. 1 illustrates a block diagram of a system environment in which a class-specific object editing system is implemented in accordance with one or more implementations.

This disclosure describes one or more embodiments of a class-specific object editing system that generates synthesized digital images utilizing class-specific generator neural networks. Specifically, in one or more embodiments, the class-specific object editing system generates (or otherwise obtains) a synthesized digital image including one or more identifiable objects. Additionally, in response to identifying one or more objects in a synthesized digital image, the class-specific object editing system selects class-specific generator neural networks corresponding to classes of objects identified in the synthesized digital image. The class-specific object editing system utilizes the selected class-specific generator neural networks to generate synthesized objects corresponding to the identified objects. The class-specific object editing system then replaces the identified objects in the synthesized digital image with the synthesized images from the class-specific generator neural networks. By replacing objects in a synthesized digital image with objects synthesized via class-specific generator neural networks, the class-specific object editing system improves the accuracy of synthesized digital images.

As mentioned, in one or more embodiments, the class-specific object editing system generates a synthesized digital image. For instance, the class-specific object editing system utilizes an image synthesis neural network to generate a synthesized digital image including one or more objects (e.g., foreground objects). In one or more embodiments, the image synthesis neural network generates a conditional synthesized digital image based on at least one map indicating positions and/or locations of the one or more objects. To illustrate, the class-specific object editing system utilizes the image synthesis neural network to generate a synthesized digital image based on a semantic label map. In some embodiments, the class-specific object editing system also utilizes an edge map with the semantic label map to generate the synthesized digital image including one or more objects indicated by the semantic label map and the edge map.

After generating or otherwise obtaining a synthesized digital image, in one or more embodiments, the class-specific object editing system determines objects and object classes in the synthesized digital image. To illustrate, the class-specific object editing system utilizes a semantic label map and/or an edge map associated with the synthesized digital image to determine one or more objects. The class-specific object editing system also determines classes of the objects identified in the synthesized digital image, such as by determining labels of object instances associated with the objects from the semantic label map. In alternative embodiments which lack a semantic label map, the class-specific object editing system utilizes an object detection neural network to detect the one or more objects and their locations within the synthesized digital image. For example, the class-specific object editing system utilizes one or more of the object detection neural networks described in U.S. patent application Ser. No. 16/388,115, "Robust Training of Large-Scale Object Detectors with Noisy Data," filed on Apr. 8, 2019; U.S. Pat. No. 10,216,766, "Large-Scale Image Tagging Using Image-To-Topic Embedding," filed on Mar. 20, 2017; or in U.S. patent application Ser. No. 15/921,492, "Detecting Objects Using A Weakly Supervised Model," filed on Mar. 14, 2018, the entire contents of the foregoing patent and applications are hereby incorporated by reference in their entirety. In still further embodiments, the class-specific object editing system detect the one or more objects and their locations within the synthesized digital image based on user input (e.g., receives user input indicating a bounding box containing an object and a label for the object).

In connection with determining objects and object classes in a synthesized digital image, the class-specific object editing system also selects class-specific generator neural networks corresponding to the objects and object classes. Specifically, the class-specific object editing system selects class-specific generator neural networks trained to generate synthesized objects of specific classes corresponding to the identified object classes. Accordingly, the class-specific object editing system selects separate class-specific generator neural networks to synthesize different objects based on different classes objects in a synthesized digital image—such as identifying a first class-specific generator neural network corresponding to a first object class and a second class-specific generator neural network corresponding to a second object class.

Furthermore, in one or more embodiments, the class-specific object editing system generates synthesized objects utilizing selected class-specific generator neural networks. For example, in response to selecting a plurality of class-specific generator neural networks corresponding to a plurality of object classes in a synthesized digital image, the class-specific object editing system utilizes the selected class-specific generator neural networks to generate a plurality of different synthesized objects. To illustrate, the class-specific object editing system crops the synthesized digital image to a particular object and then utilizes the corresponding class-specific generator neural network to generate a synthesized object based on the cropped portion of the synthesized digital image. In additional embodiments, the class-specific object editing system also crops a semantic label map to an object label corresponding to the particular object and provides the cropped portion of the semantic label map to generate the synthesized object. The class-specific object editing system thus utilizes information about an object and context information corresponding to the object from the cropped portion of the synthesized digital image to generate a new synthesized object.

In one or more embodiments, the class-specific object editing system replaces one or more objects in a synthesized digital image with one or more synthesized objects. In particular, after generating a synthesized object utilizing a class-specific generator neural network, the class-specific object editing system replaces a corresponding object with the synthesized object at a particular location within the synthesized digital image. For example, the class-specific object editing system inserts the synthesized object into the particular location utilizing alpha blending. Because the class-specific object editing system utilizes context information to generate synthesized objects, the class-specific object editing system inserts the synthesized objects into the synthesized digital image to blend into the rest of the image.

The disclosed class-specific object editing system provides a number of benefits over conventional systems. For example, the class-specific object editing system improves the accuracy of computing systems that generate synthesized digital images. In contrast to existing systems that utilize a single generator neural network to generate synthesized digital images, the class-specific object editing system utilizes a plurality of class-specific generator neural networks to generate and modify synthesized digital images. Specifically, conventional systems that utilize a single generator neural network tend to allocate resources toward generating larger content such as background content and neglect details of smaller objects in the foreground. By generating separate synthesized objects of different classes using separate class-specific generator neural networks, the class-specific object editing system generates synthesized digital images with accurate and improved details of individual objects. More specifically, the class-specific generator neural networks provide improved textural details and better shape integrity for a variety of object classes relative to conventional systems.

Furthermore, the class-specific object editing system improves the flexibility of computing systems that generate synthesized digital images. In particular, as previously mentioned, conventional systems that rely on a single generator neural network with spatially-adaptive normalization are limited to lower resolution image synthesis. The class-specific object editing system, however, utilizes a modified generator neural network structure that generates higher quality images that are easily scaled to high resolutions. More specifically, the class-specific object editing system utilizes an encoder to extract hierarchical feature representations at a plurality of different resolutions to modulate the generator neural network. Additionally, the class-specific object editing system provides the hierarchical feature representations to a plurality of class-specific generator neural networks to provide accurate details for individual foreground objects at different resolutions. The class-specific object editing system also provides improved flexibility in generating objects in out-of-distribution/context scene images (e.g., by placing objects in locations those objects are not typically found).

In addition, the class-specific object editing system improves the efficiency of computing systems that train and implement generator neural networks for generating synthesized digital images. For example, conventional systems that utilize spatially-adaptive normalization to generate synthesized digital images can require less resources and time to train generator neural networks. By utilizing an encoder to extract hierarchical feature representations in connection with generating a synthesized digital image (e.g., from a semantic label map) to modulate a generator neural network, the class-specific object editing system also results in a generator neural network that is less memory intensive and faster to train than the conventional generator neural networks.

Turning now to the figures, FIG. 1 includes an embodiment of a system environment 100 in which a class-specific object editing system 102 (or "object editing system 102"). In particular, the system environment 100 includes server device(s) 104 and a client device 106 in communication via a network 108. Moreover, as shown, the server device(s) 104 include a digital image system 110, which includes the class-specific object editing system 102. Furthermore, FIG. 1 illustrates that the class-specific object editing system 102 includes class-specific generator neural networks 112. Additionally, the client device 106 includes a digital image application 114, which optionally includes the digital image system 110, the class-specific object editing system 102, and the class-specific generator neural networks 112.

As shown in FIG. 1, the server device(s) 104 includes or hosts the digital image system 110. Specifically, the digital image system 110 includes, or is part of, one or more systems that implement digital image processing and/or digital image generation. For example, the digital image system 110 provides tools for viewing, generating, editing, and/or otherwise interacting with digital images (e.g., via the digital image application 114 of the client device 106). In one or more embodiments, the digital image system 110 processes digital content items including digital images and/or digital videos. To illustrate, the digital image system 110 utilizes neural networks to generate and/or modify synthesized digital images. In one or more embodiments, the digital image system 110 generates datasets of synthesized digital images or digital videos in connection with training neural networks or machine-learning models (e.g., segmentation neural networks, generator neural networks). In one or more additional embodiments, the digital image system 110 processes digital images in connection with one or more additional systems such as cloud-storage systems.

In connection with generating or modifying digital images, the digital image system 110 includes the class-specific object editing system 102 to generate synthesized objects within digital images. In particular, the class-specific object editing system 102 utilizes the class-specific generator neural networks 112 to generate individual synthesized objects of a plurality of object classes to refine a synthesized digital image. For example, the digital image system 110 (or the class-specific object editing system 102) generates a base (e.g., initial) synthesized digital image utilizing a conditional generator neural network. More specifically, the digital image system 110 generates a synthesized digital image from a semantic label map or other prior that indicates a structure or layout of foreground and/or background objects in the resulting image.

In one or more embodiments, a synthesized digital image includes a digital image that is at least partially generated by a neural network. In particular, a synthesized digital image includes a digital image created from one or more priors indicating positions and classes of objects. For instance, a synthesized digital image is a digital image generated by a generator neural network based on a semantic label map. In one or more embodiments, a generator neural network further generates a synthesized digital image based on an edge map indicating edges of objects. According to some embodiments, a synthesized digital image includes a digital image representation of a real-world scene generated by a neural network.

In one or more embodiments, a semantic label map includes a representation of labels for a plurality of objects within a scene. To illustrate, a semantic label map includes a plurality of values indicating object classes for a plurality of pixels in a digital image. Thus, a semantic label provides information indicating positions and classes of a plurality of background and/or foreground objects within a digital image.

In one or more embodiments, the class-specific object editing system 102 modifies a synthesized digital image by generating one or more synthesized objects to replace one or more objects from the synthesized digital image. Specifically, the class-specific object editing system 102 determines classes of objects in the synthesized digital image. Additionally, the class-specific object editing system 102 utilizes the class-specific generator neural networks 112 corresponding to the determined classes of objects to generate new, synthesized objects. The class-specific object editing system 102 also replaces the objects in the synthesized digital image with the corresponding synthesized objects.

In one or more embodiments, a neural network includes a computer representation that is tunable based on inputs to approximate unknown functions. In particular, a neural network includes one or more layers (i.e., artificial neurons) that utilize algorithms to learn from, and make predictions on, known data by analyzing the known data to learn to generate outputs that reflect patterns and attributes of the known data. For example, a neural network makes high-level abstractions in data by generating data-driven predictions or decisions from the known input data. In some embodiments, a neural network includes, but is not limited to, a convolutional neural network, a recurrent neural network, a residual neural network, or an adversarial neural network. To illustrate, a neural network includes a generator neural network for generating synthesized digital images. In one or more embodiments, a generator neural network includes a generative adversarial network with one or more encoders or decoders including residual neural network layers, linear neural network layers, rectified linear unit neural network layers, and/or other neural network layers. In addition, a class-specific neural network includes a generator neural network trained to generate digital image content corresponding to a particular object class. Accordingly, generator neural networks described herein provide operations for generating synthesized digital images and/or portions of synthesized digital images.

Furthermore, in one or more embodiments, an object includes a visible item with a definable boundary relative to other visible items in a scene. For example, an object includes an item in a foreground of a scene including, but not limited to, real-world items such as furniture, people, faces, clothing, buildings, vehicles, or the like. Additionally, in one or more embodiments, an object includes a portion of a larger object (i.e., a subcomponent of an object) such as a particular body part or a vehicle component. In some embodiments, a digital image includes a plurality of foreground objects presented according to a particular perspective such that one or more of the objects overlap one or more other objects in a scene.

Additionally, as mentioned, each object in a digital image corresponds to an object class. In one or more embodiments, an object class includes a particular category of object. For instance, an object class includes a label or description indicating the category of the object from a plurality of possible categories. To illustrate, an object class includes, but is not limited to, a particular real-world item such as furniture, person, face, clothing item, building, vehicle, etc. In additional embodiments, an object class corresponds to a particular subcomponent of another object such as a particular body part (e.g., face or limb) or a particular clothing item.

In one or more embodiments, the server device(s) 104 include a variety of computing devices, including those described below with reference to FIG. 12. For example, the server device(s) 104 includes one or more servers for storing and processing data associated with synthesized digital images and synthesized objects. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 12. Furthermore, the client device 106 can be operated by a user (e.g., a user included in, or associated with, the system environment 100) to perform a variety of functions. In particular, the client device 106 performs functions such as, but not limited to, accessing, generating, viewing, modifying, and otherwise interacting with digital images or datasets of digital images via the digital image application 114. The client device 106 also performs functions for generating, capturing, or accessing data to provide to the digital image system 110 and the class-specific object editing system 102 in connection with generating and modifying digital images. For example, the client device 106 communicates with the server device(s) 104 via the network 108 to provide digital images to the server device(s) 104 or receive digital images from the server device(s) 104. Although FIG. 1 illustrates the system environment 100 with a single client device 106, the system environment 100 can include a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 12.

Although FIG. 1 illustrates the server device(s) 104 and the client device 106 communicating via the network 108, in alternative embodiments, the various components of the class-specific object editing system 102 communicate and/or interact via other methods (e.g., the server device(s) 104 and the client device 106 can communicate directly). Furthermore, although FIG. 1 illustrates the class-specific object editing system 102 being implemented by a particular component and/or device within the system environment 100, the class-specific object editing system 102 can be implemented, in whole or in part, by other computing devices and/or components in the system environment 100 (e.g., the client device 106). Additionally, the server device(s) 104 and/or the client device 106 may access synthesized digital images from a third-party system via the network 108.

In particular, in some implementations, the class-specific object editing system 102 on the server device(s) 104 supports the class-specific object editing system 102 on the client device 106. For instance, the class-specific object editing system 102 on the server device(s) 104 learns parameters for the class-specific generator neural networks 112. The class-specific object editing system 102 then, via the server device(s) 104, provides the class-specific generator neural networks 112 to the client device 106. In other words, the client device 106 obtains (e.g., downloads) the class-specific generator neural networks 112 with the learned parameters from the server device(s) 104. Once downloaded, the client device 106 can utilize the class-specific generator neural networks 112 to perform one or more image editing tasks independent from the server device(s) 104.

In alternative implementations, the class-specific object editing system 102 includes a web hosting application that allows the client device 106 to interact with content and services hosted on the server device(s) 104. To illustrate, in one or more implementations, the client device 106 accesses a web page supported by the server device(s) 104. The client device 106 provides input to the server device(s) 104 to perform an image editing task utilizing the class-specific object editing system 102, and, in response, the class-specific object editing system 102 on the server device(s) 104 performs the task. The server device(s) 104 then provides the output or results of the image editing task to the client device 106.

Figure 2:
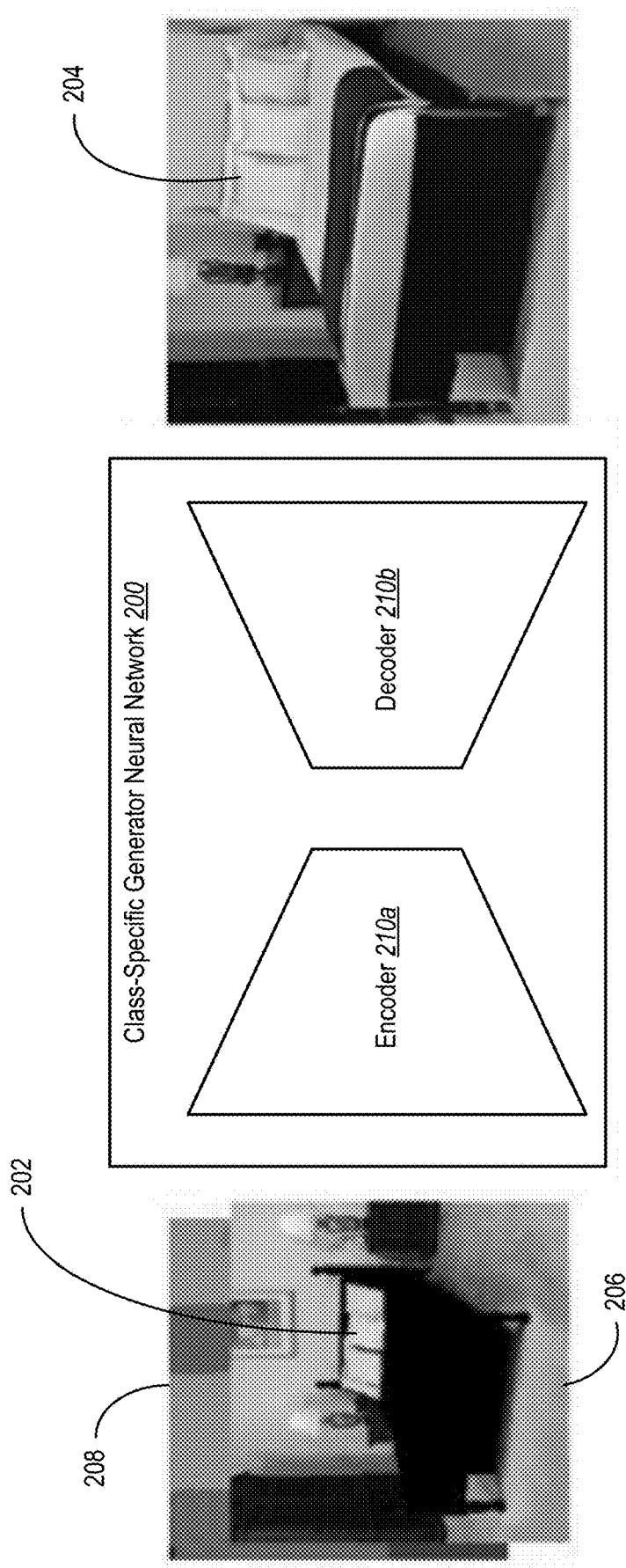
FIG. 2 illustrates a diagram of the class-specific object editing system utilizing a class-specific generator neural network to generate a synthesized object for a synthesized digital image in accordance with one or more implementations.

In one or more embodiments, the class-specific object editing system 102 accurately, flexibly, and efficiently generates synthesized digital images. Specifically, the class-specific object editing system 102 replaces objects in synthesized digital images with synthesized objects having improved texture and shape details over the initial synthesized digital images. FIG. 2 illustrates that the class-specific object editing system 102 utilizes an object of a synthesized digital image to generate a new synthesized object. More specifically, FIG. 2 illustrates that the class-specific object editing system 102 utilizes a class-specific generator neural network to generate the synthesized object to replace the object of a synthesized digital image.

As mentioned, FIG. 2 illustrates that the class-specific object editing system 102 utilizes a class-specific generator neural network 200 to replace an object of a synthesized digital image with a synthesized object. In one or more embodiments, the class-specific object editing system 102 first identifies an object 202 in a foreground of a digital image (e.g., a synthesized digital image generated by a generator neural network). For example, FIG. 2 illustrates that the object 202 includes a piece of furniture (e.g., a bed) in a scene that includes one or more additional objects in the foreground and/or background relative to the object 202.

In one or more additional embodiments, the class-specific object editing system 102 utilizes the class-specific generator neural network 200 to generate a synthesized object 204 from the object 202. Additionally, the class-specific object editing system 102 utilizes the class-specific generator neural network 200 to process a portion 206 of the synthesized digital image including the object 202. To illustrate, the class-specific object editing system 102 crops the synthesized digital image to the portion 206 of the synthesized digital image including the object 202 and context data for the object 202. In one or more additional embodiments, the class-specific object editing system 102 also utilizes the class-specific generator neural network 200 to process a portion 208 of a semantic label map corresponding to the object 202.

In one or more embodiments, context data refers to visual information associated with, but not included in, an object within a digital image. For example, context data includes one or more portions of a digital image surrounding a particular object. To illustrate, the context data includes a plurality of pixels within a cropped portion of the digital image that includes the object and portions of one or more foreground objects or background objects from a scene (e.g., pixels in the portion 206 of the synthesized digital image around the object 202). More specifically, the context data can include semantic information for one or more portions of a semantic label map or segmentation map (e.g., semantic information from the portion 208 of the semantic label map around the object 202). Additionally, in one or more embodiments, the class-specific object editing system 102 crops the synthesized digital image to center objects to maintain consistent spatial alignment for generating synthesized objects utilizing generator neural networks.

In one or more embodiments, in connection with cropping the synthesized digital image to the portion 206, the class-specific object editing system 102 also masks out (e.g., excludes) the object from the portion 206. Specifically, the class-specific object editing system 102 generates a digital mask for the pixels in the portion 206 of the synthesized digital image. The class-specific object editing system 102 then utilizes the digital mask to mask out the foreground region (e.g., the object) such as by assigning zero values to the pixels associated with the foreground region. Furthermore, the class-specific object editing system 102 assigns one values to the pixels associated with the background region (e.g., portions not part of the object) to include context data from the synthesized digital image in the cropped portion. In one or more alternative embodiments, the class-specific object editing system 102 blurs the foreground region associated with the object to retain low frequency information within the cropped portion.

Additionally, as FIG. 2 illustrates, the class-specific object editing system 102 utilizes the class-specific generator neural network 200 to generate the synthesized object 204 based on the portion 206 of the synthesized digital image and the portion 208 of the semantic label map. In one or more embodiments, the class-specific generator neural network 200 includes an encoder 210a to encode information about the object 202 from the synthesized digital image. Furthermore, in one or more embodiments, the class-specific generator neural network 200 includes a decoder 210b to decode the encoded information about the object 202 and generate the synthesized object 204 corresponding to the object 202. The architecture of the class-specific generator neural network 200 is described in greater detail below with reference to FIG. 5.

In one or more embodiments, the class-specific object editing system 102 generates the synthesized object 204 to insert into the synthesized digital image. For example, the class-specific object editing system 102 inserts the synthesized object 204 into the synthesized digital image at a location corresponding to the object 202. To illustrate, the class-specific object editing system 102 utilizes alpha blending or other image processing technique to replace the object 202 with the synthesized object 204. Additionally, by utilizing context data associated with the object 202 to generate the synthesized object 204, the class-specific object editing system 102 more accurately blends the synthesized object 204 into the synthesized digital image with other objects in the foreground and/or background by gathering hints from the surrounding context of the target object and generating foreground pixels that appear consistent with the background.

Figure 3:
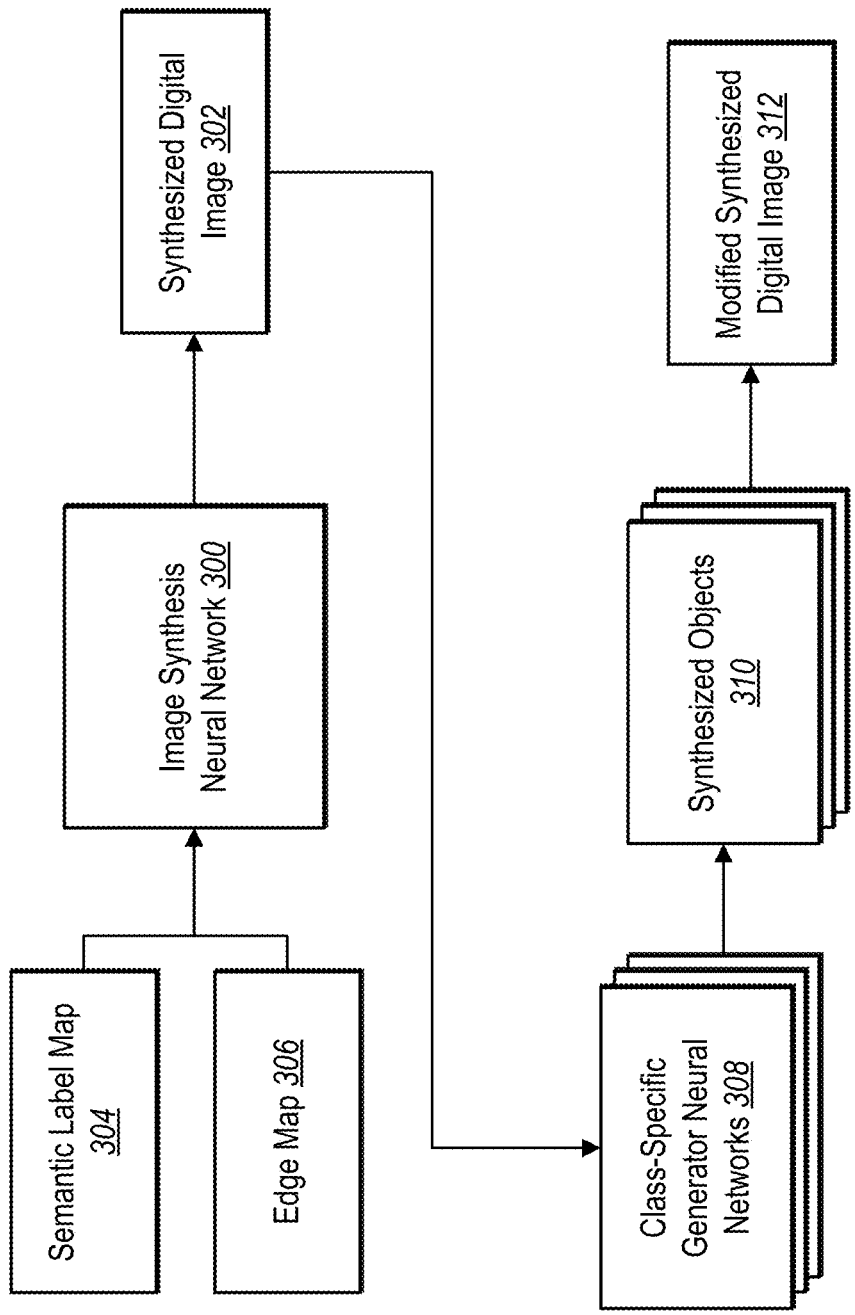
FIG. 3 illustrates a diagram of the class-specific object editing system generating a modified synthesized digital image utilizing class-specific generator neural networks in accordance with one or more implementations.

FIG. 3 illustrates an overview diagram of the class-specific object editing system 102 modifying a synthesized digital image via the use of one or more class-specific generator neural networks in accordance with content of the synthesized digital image. In particular, FIG. 3 illustrates that the class-specific object editing system 102 utilizes generator neural networks to generate and modify the synthesized digital image. In one or more embodiments, the class-specific object editing system 102 utilizes conditional generator neural networks to generate synthesized digital images based on prior information indicating positions and/or classes of one or more objects in the synthesized digital images.

In one or more embodiments, as FIG. 3 illustrates, the class-specific object editing system 102 first utilizes an image synthesis neural network 300 to generate a synthesized digital image 302. For instance, the image synthesis neural network 300 includes a conditional generator neural network that generates synthesized digital images based on one or more priors. To illustrate, the image synthesis neural network 300 includes a generative adversarial neural network to generate the synthesized digital image 302 based on data indicating one or more objects, one or more object classes, and object positions for generating the synthesized digital image 302. More specifically, the class-specific object editing system 102 utilizes the image synthesis neural network 300 to generate the synthesized digital image 302 from a semantic label map 304 and an edge map 306.

According to one or more embodiments, the semantic label map 304 includes semantic information that indicates a position and class of one or more objects for generating the synthesized digital image 302. In particular, the image synthesis neural network 300 utilizes labels of the semantic label map 304 to determine object classes corresponding to a plurality of pixels for generating the synthesized digital image 302. For instance, the semantic label map 304 includes groups of pixels associated with a particular object class indicating a location and a category of an object. Additionally, in one or more embodiments, the image synthesis neural network 300 utilizes the edge map 306 including edges of objects in connection with the semantic label map 304 to generate the synthesized digital image 302 with improved accuracy over the semantic label map 304 alone. Although FIG. 3 illustrates that the class-specific object editing system 102 utilizes the image synthesis neural network 300 to generate the synthesized digital image 302 from the semantic label map 304 and the edge map 306, in other embodiments, the class-specific object editing system 102 generates the synthesized digital image 302 from another prior, such as another digital image (e.g., a photograph).

As previously mentioned, the class-specific object editing system 102 generates the synthesized digital image 302 as an initial synthesized digital image. Specifically, the class-specific object editing system 102 utilizes the image synthesis neural network 300 to generate the synthesized digital image that covers an entire scene. For instance, the class-specific object editing system 102 utilizes the image synthesis neural network 300 to generate larger details such as for background object classes like landscapes, walls, floors, etc. In one or more embodiments, the class-specific object editing system 102 (or another system) trains the image synthesis neural network 300 to focus on the larger/more significant object classes. By focusing training of the image synthesis neural network 300, however, the resulting synthesized digital image 302 may have reduced details for smaller objects or textures such as details on furniture, faces, or other objects. The architecture of the image synthesis neural network 300 is described in greater detail below with reference to FIG. 5.

In one or more embodiments, after generating the synthesized digital image 302, the class-specific object editing system 102 improves the synthesized digital image 302 by modifying details of foreground objects in the synthesized digital image 302. For example, the class-specific object editing system 102 determines one or more foreground objects in the synthesized digital image 302 and one or more object classes associated with the one or more foreground objects. To illustrate, the class-specific object editing system 102 identifies objects and object classes based on the semantic label map 304.

In addition, the class-specific object editing system 102 selects class-specific generator neural networks 308 corresponding to the identified foreground object(s) and object class(es). In one or more embodiments, the class-specific object editing system 102 creates and trains a plurality of class-specific generator neural networks for a plurality of different object classes. Furthermore, if the synthesized digital image 302 includes a first object of a first object class and a second object of a second object class, the class-specific object editing system 102 selects a first class-specific generator neural network for the first object class and a second class-specific generator neural network for the second object class.

According to one or more embodiments, the class-specific object editing system 102 generates synthesized objects 310 utilizing the class-specific generator neural networks 308. Specifically, the class-specific object editing system 102 utilizes a particular class-specific generator neural network to generate a synthesized object of a particular object class. To illustrate, the class-specific object editing system 102 utilizes a first class-specific generator neural network to generate a first synthesized object of the first object class. Additionally, the class-specific object editing system 102 utilizes a second class-specific generator neural network to generate a second synthesized object of the second object class. The class-specific object editing system 102 accordingly generates a plurality of synthesized objects utilizing corresponding class-specific generator neural networks according to the identified object classes in the synthesized digital image 302.

As illustrated in FIG. 3, after generating the synthesized objects 310, the class-specific object editing system 102 then generates a modified synthesized digital image 312. For instance, the class-specific object editing system 102 replaces identified objects in the synthesized digital image 302 with the synthesized objects 310. In one or more embodiments, the class-specific object editing system 102 determines positions of the objects in the synthesized digital image 302. The class-specific object editing system 102 then inserts the synthesized objects 310 into the synthesized digital image 302 at the positions of the corresponding objects to generate the modified synthesized digital image 312. According to some embodiments, the class-specific object editing system 102 inserts the synthesized objects 310 utilizing alpha blending to blend the synthesized objects 310 as foreground objects into the modified synthesized digital image 312.

Figure 4A:
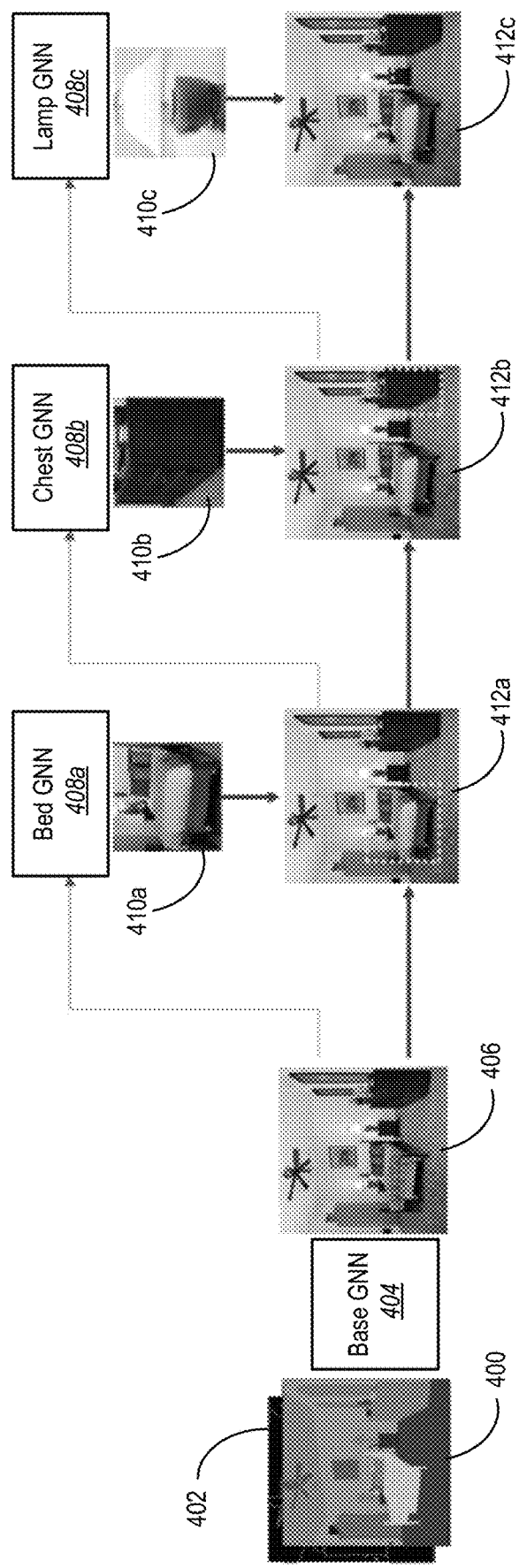
FIG. 4A illustrates a diagram of a process for generating a plurality of synthesized objects to modify a synthesized digital image in accordance with one or more implementations.

FIG. 4A illustrates a diagram of the class-specific object editing system 102 generating a modified synthesized digital image including a plurality of synthesized objects. In particular, FIG. 4A illustrates that the class-specific object editing system 102 generates and inserts the synthesized objects into a synthesized digital image according to a particular order. For instance, the class-specific object editing system 102 inserts the synthesized objects in series (e.g., one at a time) to account for updated context data associated with each synthesized object. In one or more alternative embodiments, the class-specific object editing system 102 inserts synthesized objects into a synthesized digital image in parallel (e.g., at the same time).

As illustrated in FIG. 4A, in one or more embodiments, the class-specific object editing system 102 obtains a semantic label map 400 and an edge map 402 including information indicating objects and object classes for generating a synthetic digital image. According to some embodiments, the semantic label map 400 and the edge map 402 correspond to a real-world image that the class-specific object editing system 102 processes. To illustrate, the class-specific object editing system 102 obtains the semantic label map 400 and the edge map 402 from the real-world image for use in generating synthetic digital images based on the real-world image. Alternatively, the class-specific object editing system 102 generates the semantic label map or other object label map (or portion of a semantic label map) utilizing a neural network or other system.

According to one or more embodiments, the class-specific object editing system 102 utilizes a base generator neural network 404 ("Base GNN") to generate a base synthesized digital image 406 from the semantic label map 400 and the edge map 402. The base generator neural network 404 is the same neural network as the image synthesis neural network 300 described above. For example, as mentioned, the base generator neural network 404 or image synthesis neural network 300 generates the base synthesized digital image 406 to synthesize details primarily associated with in the foreground and/or background associated with larger object classes. Accordingly, the base synthesized digital image 406 can include fewer or less accurate details associated with some objects in the scene. To illustrate, if the scene is a bedroom scene, as illustrated in FIG. 4A, the base synthesized digital image 406 includes a room with various objects (e.g., furniture) inserted into the room by the base generator neural network 404. Because the base generator neural network 404 may not be trained for specific object classes, the resulting base synthesized digital image 406 can include less accurate details for the furniture in the room.

In one or more embodiments, the class-specific object editing system 102 identifies the objects in the scene of the base synthesized digital image 406. In particular, the class-specific object editing system 102 determines that the scene of the base synthesized digital image 406 includes a plurality of furniture objects. The class-specific object editing system 102 then selects a plurality of class-specific generator neural networks corresponding to each of the objects in the base synthesized digital image 406. For example, the class-specific object editing system 102 selects a first generator neural network 408a corresponding to a bed ("Bed GNN"), a second generator neural network 408b corresponding to a chest ("Chest GNN"), and a third generator neural network 408c corresponding to a lamp ("Lamp GNN"). In one or more embodiments, the class-specific object editing system 102 trains each generator neural network according to the corresponding object class (e.g., train the first generator neural network 408a on a dataset of images including beds, the second generator neural network 408b on a dataset of images including chests, the third generator neural network 408c on a dataset of images including lamps).

In one or more embodiments, the class-specific object editing system 102 generates a first synthesized object 410a utilizing the first generator neural network 408a. For instance, the class-specific object editing system 102 generates the first synthesized object 410a including a synthesized bed corresponding to a bed from the base synthesized digital image 406. To illustrate, the class-specific object editing system 102 utilizes the first generator neural network 408a to generate the first synthesized object 410a from a cropped portion of the base synthesized digital image 406 corresponding to the first object (e.g., the bed). In connection with generating the first synthesized object 410a, the first generator neural network 408a utilizes context data from the base synthesized digital image 406 surrounding the bed.

As illustrated in FIG. 4A, the class-specific object editing system 102 replaces the corresponding object in the base synthesized digital image 406 with the first synthesized object 410. In one or more embodiments, the class-specific object editing system 102 inserts the first synthesized object 410a into the base synthesized digital image 406. For example, the class-specific object editing system 102 inserts the synthesized bed into the base synthesized digital image 406 to generate a first synthesized digital image 412a that includes the first synthesized object 410a.

After generating the first synthesized digital image 412a with the first synthesized object 410a, the class-specific object editing system 102 then utilizes the second generator neural network 408b to generate a second synthesized object 410b. In particular, the class-specific object editing system 102 determines a second object (e.g., a chest) and context data for the second object from the first synthesized digital image 412a. Because the class-specific object editing system 102 inserted the first synthesized object 410a to generate the first synthesized digital image 412a, the class-specific object editing system 102 determines context data for the second object based on the modifications due to inserting the first synthesized object 410a. In one or more embodiments, the class-specific object editing system 102 generates a cropped image from the first synthesized digital image 412a for the second object, which may have context data including the first synthesized object 410a. Accordingly, the class-specific object editing system 102 utilizes the second generator neural network 408b to generate the second synthesized object 410b based on context data that may be modified by the first synthesized object 410a.

As illustrated in FIG. 4A, the class-specific object editing system 102 utilizes the second synthesized object 410b to generate a second synthesized digital image 412b. Specifically, the class-specific object editing system 102 replaces the second object (e.g., the chest) in the first synthesized digital image 412a with the second synthesized object 410b, resulting in the second synthesized digital image 412b. In one or more embodiments, the class-specific object editing system 102 generates the second synthesized digital image 412b by inserting the second synthesized object 410b into the first synthesized digital image 412a at the location corresponding to the second object utilizing the context data obtained from the first synthesized digital image 412a.

Additionally, FIG. 4A illustrates that the class-specific object editing system 102 utilizes the third generator neural network 408c to generate a third synthesized object 410c associated with a third object (e.g., a lamp). In one or more embodiments, the class-specific object editing system 102 generates a cropped portion of the second synthesized digital image 412b corresponding to the third object. In some embodiments, if the cropped portion of the second synthesized digital image 412b includes context data corresponding to the second synthesized object 410b. In other embodiments, the second synthesized object 410b is not included in the context data. The class-specific object editing system 102 utilizes the third generator neural network 408c to generate the third synthesized object 410c.

In response to generating the third synthesized object 410c, the class-specific object editing system 102 generates a third synthesized digital image 412c. In particular, the class-specific object editing system 102 replaces the third object in the second synthesized digital image 412b with the third synthesized object 410c. For example, the class-specific object editing system 102 inserts the third synthesized object 410c at a location of the third object. Accordingly, the class-specific object editing system 102 generates the third synthesized digital image 412c by inserting the third synthesized object 410c at the location of the third object.

By generating each synthesized object in series, the class-specific object editing system 102 incorporates context data corresponding to previously inserted synthesized objects when synthesizing subsequent objects. In particular, synthesized objects inserted into a digital image can affect the context data for other objects depending on the object locations and sizes. To illustrate, when cropping a digital image to a foreground object in the digital image, the cropped portion may include a bounding box with pixels corresponding to at least a portion of another foreground object. In one or more embodiments, the class-specific object editing system 102 determines a synthesis order of objects in a synthesized digital image based on object size, position, class, or another attribute. In one or more alternative embodiments, the class-specific object editing system 102 synthesizes objects for inserting into a digital image at the same time (or from the same digital image), rather than synthesizing a plurality of objects in sequence. In one or more embodiments, the class-specific object editing system 102 also dilates and softens boundaries of synthesized objects and object instance masks before applying alpha blending to insert the synthesized objects.

Figure 4C:
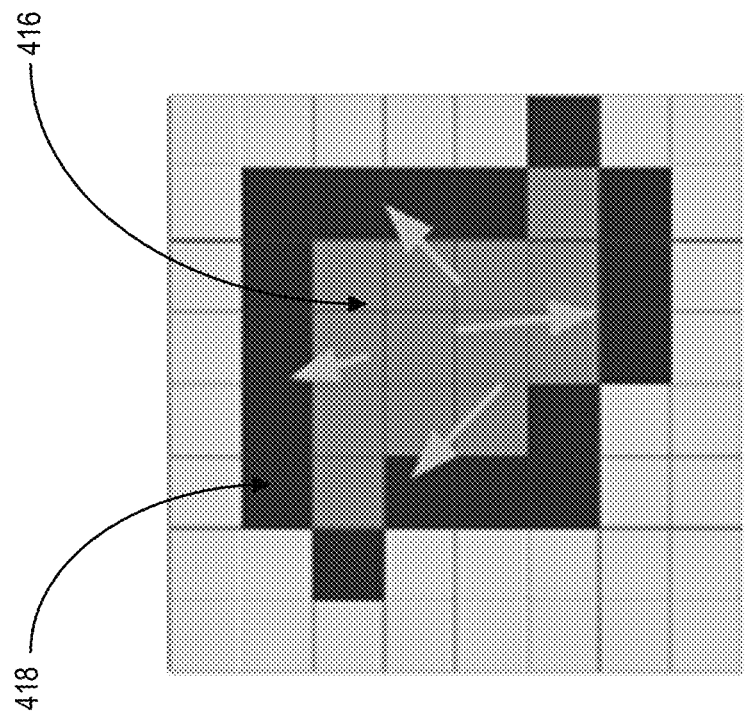
FIGS. 4B-4C illustrate diagrams of a process of feature propagation at an object instance boundary in accordance with one or more implementations.
Figure 4B:
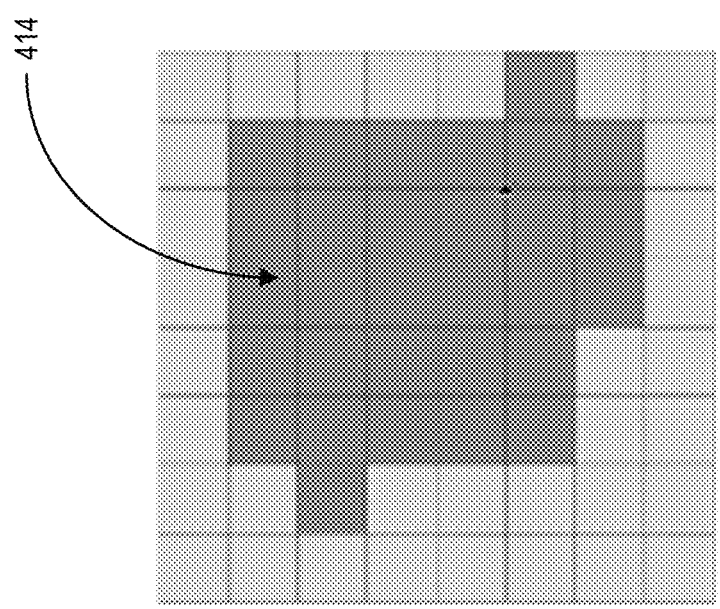

In one or more additional embodiments, the class-specific object editing system 102 utilizes feature propagation for an object instance to ensure consistencies between inner portions of the object instance and outer portions (e.g., at boundaries) of the object instance. For example, FIG. 4B illustrates a representation of an object instance 414 within a grid. FIG. 4C illustrates that the representation of the object instance includes inner features 416 and outer features 418. As mentioned, the class-specific object editing system 102 utilizes feature propagation (e.g., at a decoder component of a generator neural network) to propagate the inner features 416 to the outer features 418 (e.g., to replace the outer features 418 with the inner features 416). By propagating the inner features to the outer features 418, the class-specific object editing system 102 reduces artifacts at the boundaries of the object instance, which improves visual consistencies between the object instance and a background when using alpha blending to insert the object instance into a digital image.

Figure 5:
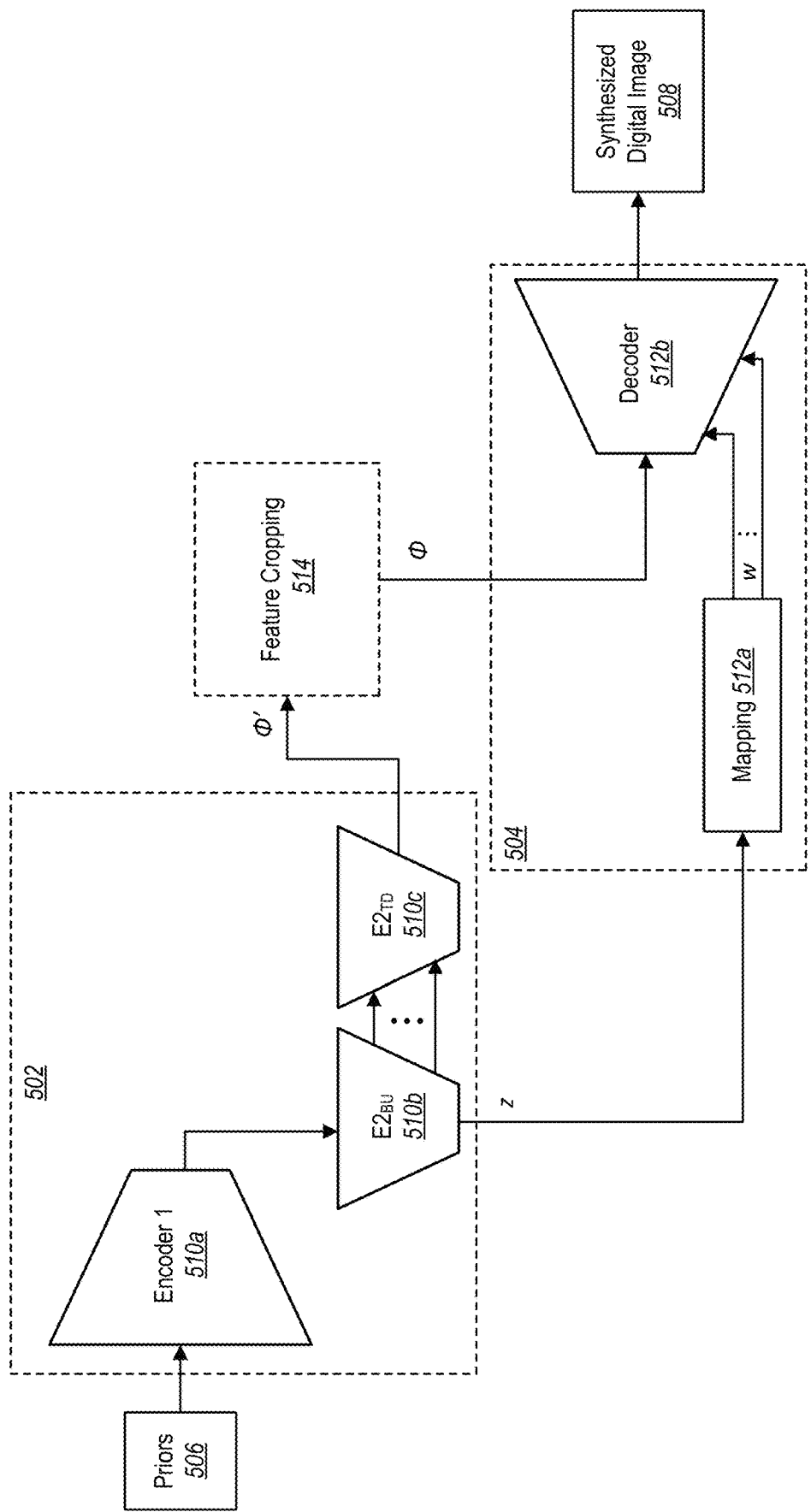
FIG. 5 illustrates a diagram of an architecture of a generator neural network utilizing class-specific object synthesis in accordance with one or more implementations.

In one or more embodiments, the class-specific object editing system 102 utilizes an image synthesis neural network in connection with a plurality of class-specific generator neural networks to generate a synthesized digital image. FIG. 5 illustrates an example architecture of a generator neural network to generate a base synthesized digital image. FIG. 5 further illustrates an architecture for each of a plurality of separate class-specific generator neural networks to generate individual synthesized objects for inserting into the base synthesized digital image.

In one or more embodiments, as illustrated in FIG. 5, a generator neural network includes an encoder 502 and a decoder 504. As shown, the encoder 502 includes a plurality of components, and the decoder 504 also includes a plurality of components. According to one or more embodiments, the encoder 502 encodes information based on priors associated with a scene and outputs one or more signals (e.g., a latent code and a spatial feature tensor). Furthermore, the decoder 504 utilizes the signals generated by the encoder 502 to generate a synthesized digital image 508.

As illustrated in FIG. 5, the encoder 502 includes a first encoder component 510a ("E2") to determine an initial representation based on the priors 506. In one or more embodiments, the first encoder component 510a includes one or more neural network layers to convert the priors 506 into a feature vector or feature map of a fixed length or size by extracting feature sets based on the priors 506. Additionally, the first encoder component 510a includes one or more neural network layers to downscale a resolution of the feature map to a first lowered resolution.

FIG. 5 further illustrates that the encoder 502 includes a second encoder component 510b ("E2$_{BU}$") and a third encoder component 510c ("E2$_{TD}$"). According to one or more embodiments, the second encoder component 510b further lowers a resolution of the feature map extracted from the priors 506. In particular, the second encoder component 510b receives the output of the first encoder component 510a and then includes one or more neural network layers in a "bottom-up" configuration to reduce the resolution of the feature map to a predetermined resolution. In one or more embodiments, the second encoder component 510b generates a plurality of feature maps with sequentially lowered resolutions (e.g., stepping a resolution down in several increments). Furthermore, the second encoder component 510b also utilizes one or more neural network layers to generate a latent code based on a feature map with a lowered resolution.

In one or more embodiments, the third encoder component 510c of the encoder 502 utilizes a plurality of feature maps at a plurality of different resolutions to generate a spatial feature tensor $\phi'$ based on the priors 506. For instance, the third encoder component 510c includes a plurality of neural network layers in a "top-down" configuration for upsampling by aggregating a plurality of feature maps or feature sets at different resolutions (e.g., by merging features from E2$_{TD}$ with the feature maps of the same spatial dimension from E2$_{BU}$). The third encoder component 510c thus incorporates information for generating the synthesized digital image 508 at a plurality of different resolutions to capture different levels of details. To illustrate, lower resolution features are semantically stronger and have more global information about all classes present in the priors 506, while higher resolutions features are more accurately aligned to the input layout.

As illustrated in FIG. 5, the decoder 504 includes a mapping component 512a to transform a latent code z generated by the encoder 502. For example, the mapping component 512a utilizes one or more neural network layers to modify the latent code while maintaining the same dimensionality. Additionally, the mapping component 512a transforms the latent code to convert a normal distribution (or other distribution resulting from generating the latent code from the priors 506) to a distribution that better matches a training dataset associated with training the decoder 504. The class-specific object editing system 102 thus ensures that the decoder component 512b accurately interprets the encoded data associated with the priors 506.

Additionally, FIG. 5 illustrates that the decoder 504 includes a decoder component 512b to generate the synthesized digital image 508. In one or more embodiments, the decoder component 512b generates the synthesized digital image 508 from the spatial feature tensor generated by the encoder 502. Furthermore, the decoder component 512b utilizes the modified latent code from the mapping component 512a to generate the synthesized digital image 508 according to the modified distribution, thereby aligning the data in the spatial feature tensor to the training data associated with the generator neural network. In some embodiments, the decoder component 512b generates the synthesized digital image 508 as a base synthesized digital image.

According to one or more embodiments, the generator neural network also includes a feature cropping component 514 for use with class-specific generator neural networks. In particular, as previously indicated, the class-specific object editing system 102 synthesizes individual objects to generate accurate synthesized digital images. In one or more embodiments, the generator neural network utilizes the feature cropping component 514 to generate one or more cropped spatial feature tensors $\phi$ corresponding to one or more objects (e.g., class instance regions) based on labels or other object classes identified from the priors 506. To illustrate, the feature cropping component 514 utilizes a fixed operation without learnable parameters to crop class instance regions from the spatial feature tensor generated by the third encoder component 510c.

After utilizing the feature cropping component 514 to generate cropped spatial feature tensors, the class-specific object editing system 102 utilizes class-specific decoders (e.g., as part of a plurality of class-specific generator neural networks) to generate synthesized objects. In particular, the class-specific object editing system 102 provides the cropped spatial feature tensors to the decoder component 512b to generate synthesized objects of object classes corresponding to the particular class-specific generator neural networks. For instance, if the decoder 504 corresponds to a class-specific generator neural network trained for a particular object class (e.g., using a dataset including objects of the particular object class), the decoder 504 generates the synthesized digital image 508 as a synthesized object of the object class. Similarly, the class-specific object editing system 102 utilizes a plurality of different decoders corresponding to class-specific generator neural networks trained for a plurality of different object classes to generate synthesized objects of the different object classes.

According to one or more embodiments, the class-specific object editing system 102 utilizes an architecture for a generator neural network to generate synthesized digital images as described in U.S. patent application Ser. No. 17/400,426 titled "GENERATING SYNTHESIZED DIGITAL IMAGES UTILIZING A MULTI-RESOLUTION GENERATOR NEURAL NETWORK", filed Aug. 12, 2021, which is herein incorporated in its entirety.

In one or more embodiments, the class-specific object editing system 102 utilizes one or more instances of a generator neural network to generate base synthesized digital images and synthesized objects to modify the base synthesized digital images. For example, a base generator neural network receives a segmentation map S (e.g., a semantic label map) and an instance edge map E to generate a base image $I_b$ that covers a scene. More specifically, $I_b=G_b(cat(S, E))$, where $cat(\cdot,\cdot)$ is a channel-wise concatenation. Furthermore, $G_b$ represents the base generator neural network including an encoder and decoder architecture, for example, as illustrated in FIG. 5. The class-specific object editing system 102 utilizes a spatial feature tensor as input to the decoder to provide the generator neural network with guidance on the generated spatial structure. By sampling different latent codes z, the generator neural network generates different results given the same segmentation map.

As mentioned, in one or more embodiments, the class-specific object editing system 102 utilizes a plurality of class-specific generator neural networks to improve the quality of smaller object classes. For instance, the class-specific object editing system 102 trains a plurality of class-specific generator neural networks to use to generate a plurality of synthesized objects (e.g., as in FIG. 4). In one or more embodiments, the class-specific object editing system 102 utilizes context data associated with each of the object instances to improve the quality of the individual objects while also ensuring consistency in the orientation, color, or lighting among different objects.

To provide context data around a target object instance to a class-specific generator neural network, the class-specific object editing system 102 determines a bounding box of the object instance from an instance map. In one or more embodiments, the class-specific object editing system 102 also enlarges the bounding box (e.g., 1.5 times or 2 times) to crop a real image $I_{real\_scene}$ and its segmentation map S. The class-specific object editing system 102 concatenates the cropped real image $C_i$ and segmentation map $C_s$ to use as context $C=cat(C_i, C_s)$ for the class-specific generator neural network $G_c$ to generate a specific instance $I_c=G_c(C)$. During training of the class-specific generator neural network $G_c$, the class-specific object editing system 102 crops $C_i$ from the real image $I_{real\_scene}$, rather than from the base image $I_b$. This provides a ground truth for supervising reconstruction of the context data and a hallucination of the foreground object, while the generated base image $I_b$ may include artifacts. In one or more embodiments, the class-specific object editing system 102 utilizes a feature cropping component within the class-specific generator neural network $G_c$ to crop a spatial feature corresponding to the instance bounding box to obtain a spatial feature $\phi$. Accordingly, the class-specific object editing system 102 generates the final synthesized object tightly within the synthesized object $I_c$ without additional context outside the instance bounding box.

According to one or more embodiments, the class-specific object editing system 102 forces the generator neural network to use the context data C, the class-specific object editing system 102 applies a perceptual loss between the generated instance $I_b$ and the target instance $I_{real\_ins}$, which the class-specific object editing system crops directly from the real image $I_{real\_scene}$ using the instance bounding box without enlarging the bounding box. Because background pixels in $I_{real\_ins}$ already exist in C (i.e., $C_i$), the generator neural network automatically encodes the background region. To prevent the generator neural network from also automatically encoding the foreground region, the class-specific object editing system utilizes one of a plurality of methods. For instance, the class-specific object editing system 102 generates a digital mask and masks out the foreground region with zeroes. Alternatively, the class-specific object editing system 102 blurs the foreground region to retain the low frequency information such that $I_c$ roughly follows the input color theme with the use of the perceptual loss. The class-specific object editing system 102 thus trains the generator neural network to gather hints from the context data of the target instance and generate foreground pixels consistent with the background.

In one or more embodiments, the class-specific object editing system 102 utilizes an adversarial loss, $R_1$ regularization, and path length regularization referred to as $\mathcal{L}_{gan}$. For the adversarial loss, the real distributions are $\{I_{real\_scene}\}$ and $\{I_{real\_ins}\}$ for the base generator neural network and class-specific generator neural network, respectively. The class-specific object editing system 102 also regularizes the encoder by applying KL-Divergence to the output of the encoder (e.g., the latent code z), thus forcing the latent code to follow a normal distribution to support multi-modal synthesis during inference, $\mathcal{L}_{kl}$. The class-specific object editing system 102 utilizes the perceptual loss: $\mathcal{L}_{perceptual}=\Sigma_i\|V_i(I_{gen})-V_i(I_{real})\|_1$, where $V_i(\cdot)$ represents the output of the $i_{th}$ layer of a pretrained convolutional neural network. Additionally, $I_{gen}$ is $I_b$ and $I_c$, $I_{real}$ is $I_{real\_scene}$ and $I_{real\_ins}$ in the base generator neural network and the class-specific generator neural network, respectively. Accordingly, the overall training loss is $\mathcal{L}=\mathcal{L}_{gan}+\lambda_1*\mathcal{L}_{kl}+\lambda_2*\mathcal{L}_{perceptual}$. In one or more embodiments, the loss weights and the frequency of regularization within $\mathcal{L}_{gan}$ are predetermined values (e.g., 0.01 and 1 for $\lambda_1$ and $\lambda_2$, respectively).

In one or more embodiments, to composite instances generated by class-specific generator neural networks, the class-specific object editing system 102 creates an alpha mask of the instance using a ground-truth instance mask Ins, $$M_{alpha} = \begin{cases} 1, & \text{if } Ins(i, j) = \text{target\_instance\_idx} \\ 0, & \text{otherwise} \end{cases}$$

where Ins is a two-dimensional map with different values at each location, and each value is the index for a unique instance. The target_instance_idx is the index for the current target instance. The class-specific object editing system 102 then resizes and relocates the generated instance $I_c$ into the correct position according to the $M_{alpha}$ to obtain the relocated generated instance $I_{c\_relocation}$. Additionally, to avoid potential small gaps due to quantization during resizing/relocating, the class-specific object editing system 102 dilates boundaries of both $M_{alpha}$ and $I_{c\_relocation}$. The composition image $I_{comp}$ is $I_{comp} = M'_{alpha} \times I'_{c\_relocation} + (1 - M'_{alpha}) \times I_b$, where $M'_{alpha}$ and $I'_{c\_relocation}$ are dilated versions of $M_{alpha}$ and $I_{c\_relocation}$. After completing composition for the first instance, the class-specific object editing system 102 uses $I_{comp}$ as the base image $I_b$ for the next instance.

Figure 6A:
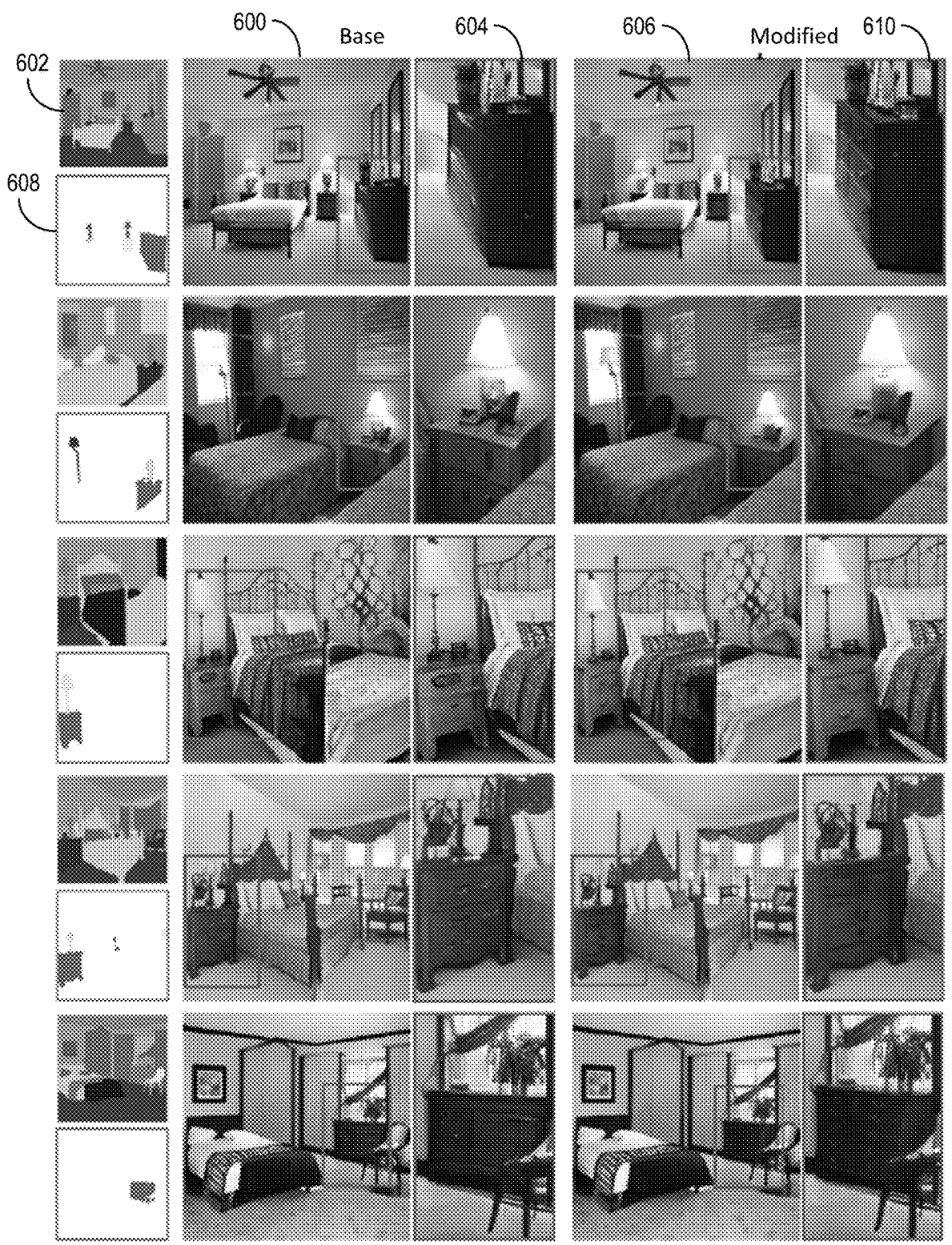
FIGS. 6A-6B illustrate digital images comparisons between base synthetized digital images and modified synthetized digital images utilizing class-specific generator neural networks in accordance with one or more implementations.

FIG. 6A illustrates a plurality of images comparing a plurality of base synthesized digital images of a particular scene (i.e., a bedroom scene with furniture) to a plurality of modified synthesized digital image. Specifically, FIG. 6A illustrates a first set of base synthesized digital images generated utilizing a base generator neural network. The first set of base synthesized digital images includes a first base synthesized digital image 600 generated based on a semantic label map 602 for the particular scene. Additionally, FIG. 6A illustrates a close-up view 604 of an object (e.g., a chest/dresser) within the scene of the base synthesized digital image 606.

FIG. 6A also illustrates a first set of modified synthesized digital images including a modified synthesized digital image 606 generated utilizing the base synthesized digital image 600 and a plurality of class-specific generator neural networks. Furthermore, FIG. 6A illustrates a composition semantic map 608 including a plurality of labels corresponding to a plurality of objects to replace from the base synthesized digital image 600. FIG. 6A also illustrates a close-up view 610 of a synthesized object to replace the object shown in the close-up view 604 of the base synthesized digital image 606. As shown, the synthesized object in the modified synthesized digital image 606 has more accurate texture and shape details than the object replaced in the base synthesized digital image 600. Similarly, the other modified synthesized digital images have improved object details over the base synthesized digital images.

Figure 6B:
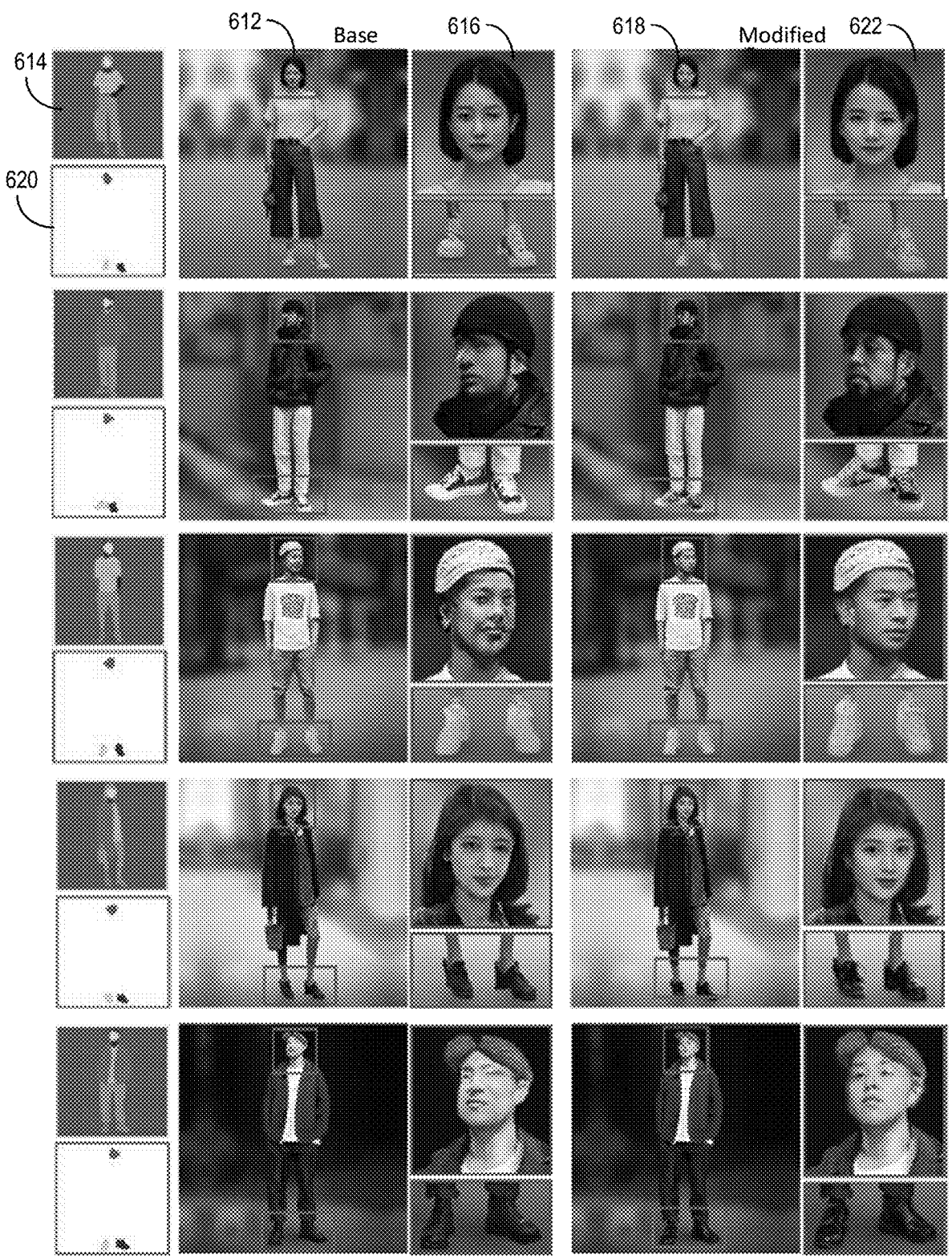

FIG. 6B illustrates a plurality of images comparing a plurality of base synthesized digital images of an additional scene (i.e., a person against a blurred background) to a plurality of modified synthesized digital image. Specifically, FIG. 6B illustrates a second set of base synthesized digital images generated utilizing a base generator neural network trained on a dataset including images similar to the additional scene. The second set of base synthesized digital images includes a base synthesized digital image 612 generated based on a semantic label map 614 for the scene. Additionally, FIG. 6B illustrates a close-up view 616 of an object (e.g., a human face) within the scene of the base synthesized digital image 612.

FIG. 6B also illustrates a second set of modified synthesized digital images including a modified synthesized digital image 618 generated utilizing the base synthesized digital image 612 and a plurality of class-specific generator neural networks. Furthermore, FIG. 6B illustrates a composition semantic map 620 including a plurality of labels corresponding to a plurality of objects to replace from the base synthesized digital image 612. FIG. 6B also illustrates a close-up view 622 of a synthesized object to replace the object shown in the close-up view 616 of the base synthesized digital image 612. The synthesized object in the modified synthesized digital image 618 has more accurate texture and shape details than the object replaced in the base synthesized digital image 612. As illustrated, although the objects and scenes in FIGS. 6A-6B are different (e.g., different object classes), by utilizing a plurality of class-specific generator neural networks, the class-specific object editing system 102 provides significantly improved object details.

Figure 7:
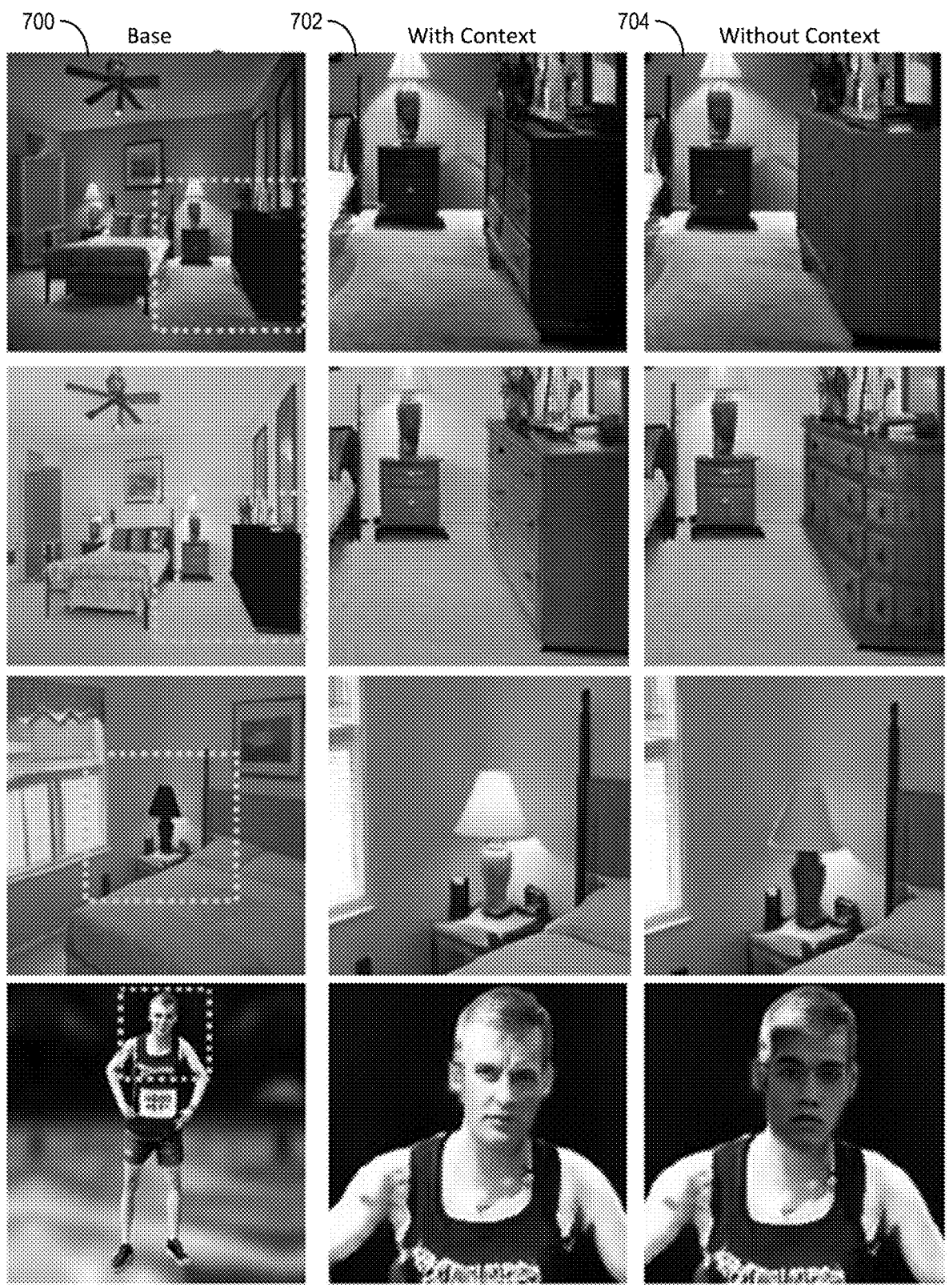
FIG. 7 illustrates a comparison of modified synthesized digital images utilizing contextual information for objects and modified synthesized digital images without contextual information for objects in accordance with one or more implementations.

FIG. 7 illustrates a plurality of synthesized digital images corresponding to a plurality of scenes. In particular, FIG. 7 illustrates comparisons of sets of base synthesized digital images, modified synthesized digital images with context data for training class-specific generator neural networks, and modified synthesized digital images without context data for training class-specific generator neural networks. To illustrate, a base synthesized digital image 700 includes synthesized foreground and background objects corresponding to a bedroom scene. The class-specific object editing system 102 generates the base synthesized digital image 700 utilizing a generator neural network with no feature cropping.

FIG. 7 also illustrates a first modified synthesized digital image 702 generated utilizing a class-specific generator neural network with context data for a synthesized object. Furthermore, FIG. 7 illustrates a second modified synthesized digital image 704 generated utilizing the class-specific generator neural network without context data for a synthesized object. As shown, the synthesized object in the first modified synthesized digital image 702 is more consistent with the rest of the scene than the synthesized object in the second modified synthesized digital image 704. The other modified synthesized digital images of FIG. 7 that utilize context data for synthesized objects also provide more accurate details and better consistency (e.g., better lighting and orientation) than the other modified synthesized digital images without context data.

Figure 8:
FIG. 8 illustrates a comparison of synthesized digital images generated by a conventional image synthesis system and synthesized digital images generated by the class-specific object editing system in accordance with one or more implementations.

FIG. 8 illustrates comparisons of synthesized digital images generated by a conventional system and synthesized digital images generated by the class-specific object editing system 102. More specifically, FIG. 8 illustrates a semantic label map 800 for generating a synthesized digital image. To illustrate, the conventional system utilizes a generator neural network with spatially-adaptive normalization, as described by Taesung Park, Ming-Yu Liu, Ting-Chun Wang, and Jun-Yan Zhu in "Semantic image synthesis with spatially-adaptive normalization" in Conference on Computer Vision and Pattern Recognition (2019) ("SPADE"), to generate a first synthesized digital image 802. FIG. 8 also illustrates a second synthesized digital image 804 that the class-specific object editing system 102 generates utilizing a class-specific generator neural network. FIG. 8 also shows that the class-specific object editing system 102 is more accurate than the conventional system in generating out-of-distribution synthesized objects (e.g., a vehicle on a sidewalk).

Figure 9:
FIG. 9 illustrates a plurality of synthesized digital images comprising a plurality of different synthetic objects utilizing class-specific generator neural networks in accordance with one or more implementations.

FIG. 9 illustrates a plurality of synthesized digital images corresponding to a plurality of different scenes. In particular, FIG. 9 illustrates that the class-specific object editing system 102 generates a plurality of different synthesized digital images for the same scene. More specifically, as illustrated in FIG. 9, the class-specific object editing system 102 generates a plurality of synthesized digital images with different versions of synthesized objects replacing a single object in a base synthesized digital image. For example, FIG. 9 illustrates a set of synthesized digital images 900a-900e including a plurality of synthesized objects (e.g., beds) including different details generated by a class-specific generator neural network. To illustrate, the beds generated by the class-specific generator neural network include different instances for a single object class, resulting in a plurality of different bed covers with different patterns.

Thus, in one or more embodiments, the class-specific object editing system 102 replaces a single object in a digital image without affecting other portions of the digital image. To illustrate, the class-specific object editing system 102 masks out an object instance to replace and provides the remaining image as context for the class-specific generator neural network. The class-specific object editing system 102 then generates a synthesized object and replaces the object instance with the synthesized object.

According to an embodiment, experimental data includes quantitative and qualitative evaluations comparing results of a base generator neural network and a composition model that utilizes class-specific generator neural networks with conventional systems. For example, the experimental data includes comparisons based on a bedroom dataset, a full human body dataset, and a cityscape dataset. In particular, the bedroom dataset combines two datasets including images according to a "bedroom" category and a "hotel_room" category. Furthermore, the full human body dataset includes high resolution images of full human bodies with blurred backgrounds and annotated with 24 classes such as faces, upper-cloths, left shoes, and right shoes. The cityscapes dataset includes street scene images.

The experimental data uses the three datasets to train a base generator neural network and baselines. The base generator neural network provides some level of accuracy for large object classes in scenes (e.g., beds in a bedroom scene or large background categories like walls and floors). Additionally, the class-specific object editing system 102 trains class-specific generator neural networks on classes of objects that are typically small and not synthesized well by the base generator neural network and baselines. Due to the class-specific object editing system 102 utilizing separate generator neural networks for separate classes, the experimental data utilizes additional datasets as extra training data sources for generating bedrooms (e.g., furniture, indoor rooms) and cityscapes (e.g., cityscapes extra, pedestrians). Table 1 below summarizes the selected classes and training sources.

| Scene | Classes | Training data sources |
|---|---|---|
| Bedroom | Bed, chair, table, chest, lamp, pillow | Bedroom + furniture<br>Bedroom + furniture + indoor rooms |
| Human | Shoes, face, upper clothes | Full human body dataset |
| Cityscapes | Car<br>Person | Cityscapes<br>Cityscapes + cityscapes extra + pedestrians |

The class-specific object editing system 102 trained the base generator neural networks to generate 512×512 resolution images for the bedroom and full human body datasets and 1024×512 images for the cityscapes dataset. Because the resolution of each class varies, the class-specific object editing system 102 trains the class-specific generator neural networks at 128×128 or 256×256 depending on the average size of each class. The class-specific object editing system 102 also trains all classes—except for the person category in cityscapes—with a blurred foreground region so that the generator neural network attempts to maintain the color tone of instances in a base image during inference time. Additionally, in one or more embodiments, the class-specific object editing system 102 uses masking, rather than blurring, for synthesizing persons in cityscapes.

As mentioned, the experimental data indicates a comparison between the class-specific object editing system 102 and the base generator neural network with SPADE and two variants of SPADE—"LGGAN" as described by Hao Tang, Dan Xu, Yan Yan, Philip H. S. Torr, and Nicu Sebe in "Local class-specific and global image-level generative adversarial networks for semantic-guided scene generation" in Conference on Computer Vision and Pattern Recognition (2020); and "OASIS" as described by Vadim Sushko, Edgar Schonfeld, Dan Zhang, Juergen Gall, Bernt Schiele, and Anna Khoreva in "You only need adversarial supervision for semantic image synthesis" in International Conference on Learning Representations (2021). The experimental data includes the base generator neural network for the conventional systems trained at higher resolution (with default parameters) and provided with an instance map for fair comparison. SPADE and OASIS resulted in significant memory usage (i.e., ~16 GB per image to train 512×512 bedroom images), while the class-specific object editing system 102 used ~4 GB per such image. LGGAN was incapable of fitting a single image on a 32 GB V100 GPU for the bedroom dataset due to the large number of parameters and separate convolutional layers for each class and resulted in slow training for the other datasets with fewer classes.

Table 2 illustrates measurements of Frechet Inception Distance ("FID") scores of the base generator neural network with the conventional systems relative to the class-specific object editing system 102 ("System 102").

| Datasets | SPADE | OASIS | LGGAN | System 102 |
|---|---|---|---|---|
| Bedroom | 44.38 | 39.21 | N/A | 33.17 |
| Human | 38.53 | 8.65 | N/A | 7.22 |
| Cityscapes | 59.68 | 50.90 | 61.46 | 47.07 |

As illustrated above, the class-specific object editing system 102 achieves lower FID scores than the other three systems. Additionally, the experimental embodiment generated synthesized images shown to a plurality of people with a segmentation map and two generated images side-by-side. Additionally, the comparison utilizes a two-alternative forced choice option between two images to determine which image looked more realistic. Table 3 below illustrates the human evaluation results indicating that people generally preferred the results of the system 102 over other systems. The class-specific object editing system 102 improves the results in the cityscape dataset by utilizing class-specific generators for smaller objects (e.g., cars and people).

| Datasets | System 102 vs SPADE | System 102 vs OASIS | System 102 vs LGGAN |
|---|---|---|---|
| Bedroom | 90.0% | 73.2% | N/A |
| Human | 82.4% | 63.2% | N/A |
| Cityscapes | 59.2% | 35.2% (83.6%) | 62.0% |

Additionally, the experimental data includes a comparison of qualitative results for SPADE, OASIS, and the base generator neural network of the class-specific object editing system 102. The class-specific object editing system 102 generated images that looked more realistic. For example, the class-specific object editing system 102 generated bedrooms with bed sheets containing more textures and cloths on generated humans contained more wrinkles. Furthermore, OASIS generated images with visible boundary artifacts on human images. The class-specific object editing system 102 is also able to generate multiple images corresponding to the same segmentation map by sampling different latent codes z.

The experimental data further utilizes per-class FID scores comparing the base generator neural network with the class-specific generator neural networks. In particular, the class-specific object editing system 102 crops each instance from an original base image and a composition image (e.g., an image including synthesized objects from class-specific generator neural networks) and resizes the cropped portions to the average crop size over all instances in the class. The experimental data also includes human evaluations of the images. Table 4 below includes per-class FID scores of the base generator neural network and the composition model of class-specific generator neural networks and the percentage of time users prefer the class-specific generator neural network over the base generator neural network.

| Datasets | Chest | Chair | Pillow | Lamp | Table | Car | Person | Face | Shoe |
|---|---|---|---|---|---|---|---|---|---|
| FID (base) | 142.87 | 166.12 | 125.03 | 86.65 | 126.21 | 44.45 | 98.99 | 15.12 | 33.12 |
| FID (comp) | 132.12 | 155.12 | 136.79 | 80.12 | 119.44 | 30.42 | 82.34 | 13.54 | 29.87 |
| User | 71% | 70% | 33% | 62% | 60% | 94% | 89% | 84% | 69% |

Additionally, compositing pixels generated by the class-specific generator neural network on top of a base image generated by the base generator neural network provides improved results over the base image.

Table 6 below also illustrates results of an ablation study comparing the impact of training class generator neural networks with additional training data for cityscapes.

| | FID ↓ | | | User Study ↑ | |
|---|---|---|---|---|---|
| | I: Base | II: Composition w/o extra | III: Composition w/ extra | I vs. II | I vs. III |
| Car | 44.45 | 36.71 | 30.42 | 23%/77% | 6%/94% |
| Person | 98.99 | 88.47 | 82.34 | 13%/87% | 11%/89% |

As shown, the class-specific generator neural networks performed better than the base generator neural network with and without using additional data. The class-specific weights and centrally aligned data thus provide an accuracy advantage over the base generator neural network alone. Using additional training data further improves the FID scores and user preference performance.

Additionally, the experimental data indicates improved performance by providing context information C as input to the class-specific generator neural networks. For example, as previously indicated with respect to FIG. 8, providing the context data to the class-specific generator neural networks causes the class-specific generator neural networks to generate objects that are consistent with the surrounding lighting condition, while generator neural networks without the context data produced inconsistent results. In particular, a lamp generator trained with context does not use blurred foreground information during training and inference, so the network relies on context to determine the lamp color. Additionally, without context data, the class-specific generator neural networks may result in incorrect inference of gender or skin color.

Figure 10:
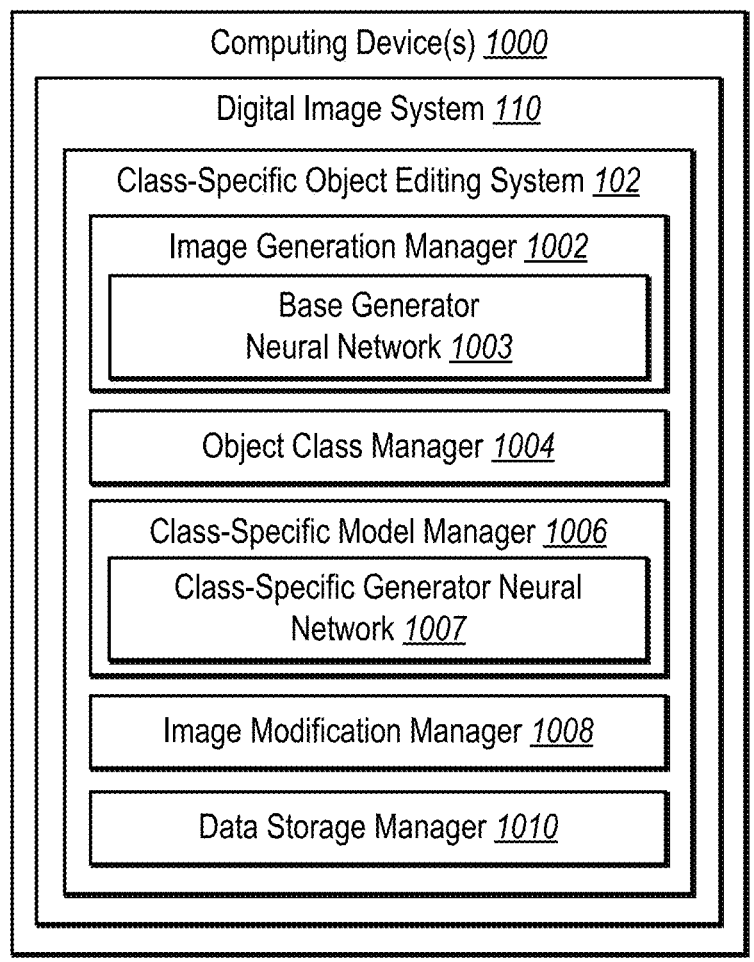
FIG. 10 illustrates a diagram of the class-specific object editing system of FIG. 1 in accordance with one or more implementations.

FIG. 10 illustrates a detailed schematic diagram of an embodiment of the class-specific object editing system 102 described above. As shown, the class-specific object editing system 102 is implemented in a digital image system 110 on computing device(s) 1000 (e.g., a client device and/or server device as described in FIG. 1, and as further described below in relation to FIG. 11). Additionally, in one or more embodiments, the class-specific object editing system 102 includes, but is not limited to, an image generation manager 1002, an object class manager 1004, a class-specific model manager 1006, an image modification manager 1008, and a data storage manager 1010. The class-specific object editing system 102 can be implemented on any number of computing devices. In one or more embodiments, the class-specific object editing system 102 is implemented in a distributed system of server devices for synthetic digital image generation. In alternative embodiments, the class-specific object editing system 102 is implemented within one or more additional systems. Alternatively, the class-specific object editing system 102 may be implemented on a single computing device such as a single client device.

In one or more embodiments, each of the components of the class-specific object editing system 102 is in communication with other components using any suitable communication technologies. Additionally, in some embodiments, the components of the class-specific object editing system 102 are in communication with one or more other devices including other computing devices of a user, server devices (e.g., cloud storage devices), licensing servers, or other devices/systems. It will be recognized that although the components of the class-specific object editing system 102 are shown to be separate in FIG. 10, any of the subcomponents may be combined into fewer components, such as into a single component, or divided into more components as may serve a particular implementation. Furthermore, although the components of FIG. 10 are described in connection with the class-specific object editing system 102, in one or more embodiments, at least some of the components for performing operations in conjunction with the class-specific object editing system 102 described herein are implemented on other devices within the environment.

In some embodiments, the components of the class-specific object editing system 102 include software, hardware, or both. For example, the components of the class-specific object editing system 102 include one or more instructions stored on a computer-readable storage medium and executable by processors of one or more computing devices (e.g., the computing device(s) 1000). When executed by the one or more processors, the computer-executable instructions of the class-specific object editing system 102 can cause the computing device(s) 1000 to perform the operations described herein. Alternatively, the components of the class-specific object editing system 102 can include hardware, such as a special purpose processing device to perform a certain function or group of functions. Additionally, or alternatively, the components of the class-specific object editing system 102 can include a combination of computer-executable instructions and hardware.

Furthermore, the components of the class-specific object editing system 102 performing the functions described herein with respect to the class-specific object editing system 102 may, for example, be implemented as part of a stand-alone application, as a module of an application, as a plug-in for applications, as a library function or functions that may be called by other applications, and/or as a cloud-computing model. Thus, the components of the class-specific object editing system 102 may be implemented as part of a stand-alone application on a personal computing device or a mobile device. Alternatively, or additionally, the components of the class-specific object editing system 102 may be implemented in any application that provides digital image modification, including, but not limited to ADOBE® PHOTOSHOP®, ADOBE® AFTER EFFECTS®, ADOBE® ILLUSTRATOR®, ADOBE® PHOTOSHOP® ELEMENTS, and ADOBE® CREATIVE CLOUD® software. "ADOBE," "PHOTOSHOP," "AFTER EFFECTS," "ILLUSTRATOR," and "CREATIVE CLOUD" are either registered trademarks or trademarks of Adobe Inc. in the United States and/or other countries.

In one or more embodiments, the image generation manager 1002 provides generation and management of synthesized digital images. For example, the image generation manager 1002 manages one or more generator neural networks to generate synthesized digital images. To illustrate, the image generation manager 1002 utilizes a base generator neural network 1003 to generate base synthesized digital images from priors such as semantic label maps and/or edge maps. In one or more embodiments, the image generation manager 1002 generates synthesized digital images in connection with generating or augmenting one or more datasets for training generator neural networks or other machine-learning models.

Additionally, the object class manager 1004 manages classes of objects for generating synthesized digital images. For instance, the object class manager 1004 utilizes a semantic label map or other segmentation map to determine a plurality of objects and object positions associated with a plurality of pixel locations for generating a synthesized digital image. In addition, the object class manager 1004 determines the object classes for objects in a semantic label map including foreground objects and background objects. The object class manager 1004 communicates with one or more other components of the class-specific object editing system 102 (e.g., the image generation manager 1002 and the class-specific model manager 1006).

Furthermore, the class-specific model manager 1006 selects class-specific generator neural networks 1007 for synthesizing digital images. In particular, the class-specific model manager 1006 communicates with the object class manager 1004 to determine object classes in a synthesized digital image. To illustrate, the class-specific model manager 1006 selects class-specific generator neural networks 1007 corresponding to object classes identified from a semantic label map. In one or more embodiments, the class-specific model manager 1006 also facilitates training and management of the class-specific generator neural networks 1007.

In one or more embodiments, the image modification manager 1008 modifies synthesized digital images utilizing synthesized objects. Specifically, the image modification manager 1008 obtains synthesized objects generated by the class-specific generator neural networks 1007 selected by the class-specific model manager 1006. The image modification manager 1008 inserts the synthesized objects into synthesized digital images to replace corresponding objects. For instance, the image modification manager 1008 utilizes alpha blending to insert synthesized objects into synthesized digital images.

The class-specific object editing system 102 also includes a data storage manager 1010 (that comprises a non-transitory computer memory/one or more memory devices) that stores and maintains data associated with processing digital images. For example, the data storage manager 1010 stores data associated with generating and modifying synthesized digital images and individual objects within synthesized digital images. To illustrate, the data storage manager 1010 stores information associated with semantic label maps, edge maps, synthesized digital images, synthesized objects, digital masks, and one or more generator neural networks.

Figure 11:
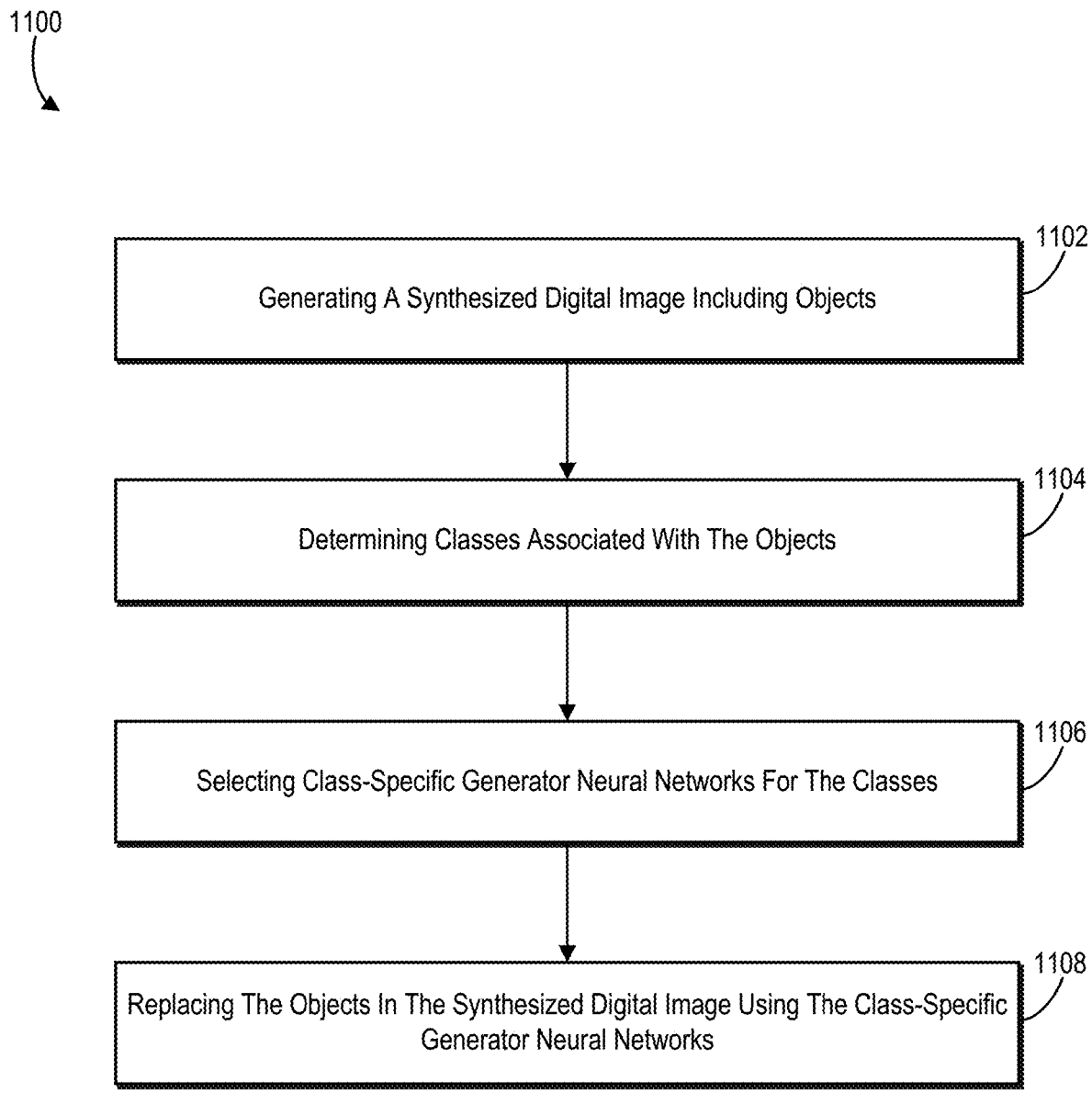
FIG. 11 illustrates a flowchart of a series of acts for generating a modified synthesized digital image utilizing class-specific object editing systems for individual objects in accordance with one or more implementations.

Turning now to FIG. 11, this figure shows a flowchart of a series of acts 1100 of generating a modified synthesized digital image utilizing class-specific object editing systems for individual objects. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11.

As shown, the series of acts 1100 includes an act 1102 of generating a synthesized digital image including objects. For example, act 1102 involves generating a synthesized digital image comprising one or more objects by utilizing an image synthesis neural network. Act 1102 can involve generating the synthesized digital image based on a semantic label map. Additionally, act 1102 can involve generating the synthesized digital image based further on an edge map.

The series of acts 1100 also includes an act 1104 of determining classes associated with the objects. For example, act 1104 involves determining one or more classes associated with the one or more objects of the synthesized digital image. Act 1104 can involve determining a first class associated with a first object and a second class associated with a second object, the first class being different than the second class. Alternatively, act 1104 can involve determining that a a first object and a second object of the synthesized digital image share a class. For example, act 1104 can involve determining classes associated with a plurality of objects from a semantic label map.

Additionally, the series of acts 1100 includes an act 1106 of selecting class-specific generator neural networks for the classes. For example, act 1106 involves selecting one or more class-specific generator neural networks based on the one or more classes associated with the one or more objects. Act 1106 can involve selecting a first class-specific generator neural network corresponding to the first class and a second class-specific generator neural network corresponding to the second class.

Furthermore, the series of acts 1100 includes an act 1108 of replacing the objects in the synthesized digital image using the class-specific generator neural networks. For example, act 1108 involves replacing the one or more objects in the synthesized digital image by utilizing the one or more class-specific generator neural networks according to the one or more classes associated with the one or more objects. Act 1108 can involve generating a first synthesized object by utilizing the first class-specific generator neural network and a second synthesized object by utilizing the second class-specific generator neural network.

Act 1108 can also involve replacing the first object with the first synthesized object within the synthesized digital image. Act 1108 can involve obtaining image context data for the second object based on the first synthesized object within the synthesized digital image. Act 1108 can also involve replacing the second object with the synthesized second object within the synthesized digital image according to the image context data for the second object.

Act 1108 can involve cropping the synthesized digital image to a bounding box corresponding to an object of the one or more objects. Act 1108 can also involve generating a synthesized object by utilizing a class-specific generator neural network to replace the object within the bounding box. For example, act 1108 can involve utilizing the class-specific generator neural network based on image context data from image pixels proximate the object of the one or more objects within the bounding box. Act 1108 can further involve inserting the synthesized object into the synthesized digital image at a position of the object of the one or more objects within the synthesized digital image. Act 1108 can also involve inserting the one or more objects into the synthesized digital image utilizing alpha blending.

Act 1108 can involve cropping a semantic label map utilized to generate the synthesized digital image to a region corresponding to the bounding box in the synthesized digital image. Additionally, act 1108 can involve generating a digital mask to mask the object out of the bounding box in the synthesized digital image. Act 1108 can then involve generating the synthesized object by utilizing the class-specific generator neural network based on the region of the semantic label map and the bounding box with the object masked out of the bounding box according to the digital mask. Act 1108 can alternatively involve blurring a region corresponding to the object within the bounding box.

Furthermore, act 1108 can involve generating a first, utilizing a first class-specific generator neural network, a first synthesized object based on a first cropped portion of the synthesized digital image. Act 1108 can involve inserting the first synthesized object into the synthesized digital image. Act 1108 can involve generating, utilizing a second class-specific generator neural network, a second synthesized object based on a second cropped portion of the synthesized digital image, the second cropped portion comprising at least a portion of the first synthesized object. Alternatively, act 1108 can involve generating, utilizing a second class-specific generator neural network, a second synthesized object based on a second cropped portion of the synthesized digital image, the second cropped portion excluding the first synthesized object. Act 1108 can then involve inserting the second synthesized object into the synthesized digital image.

Act 1108 can also involve extracting a plurality of feature sets corresponding to the first object at a plurality of different resolutions. Act 1108 can also involve determining a spatial feature tensor for the first object by aggregating the plurality of feature sets at the plurality of different resolutions. Act 1108 can then involve generating, utilizing the first class-specific generator neural network, the first synthesized object based on the spatial feature tensor.

In one or more embodiments, act 1108 involves generating, utilizing an encoder of a class-specific generator neural network, a spatial feature tensor for an object of the one or more objects. Act 1108 can also involve generating, utilizing a decoder of the class-specific generator neural network, a synthesized portion of the synthesized digital image based on the spatial feature tensor and image context data from a region of the synthesized digital image surrounding the object of the one or more objects.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
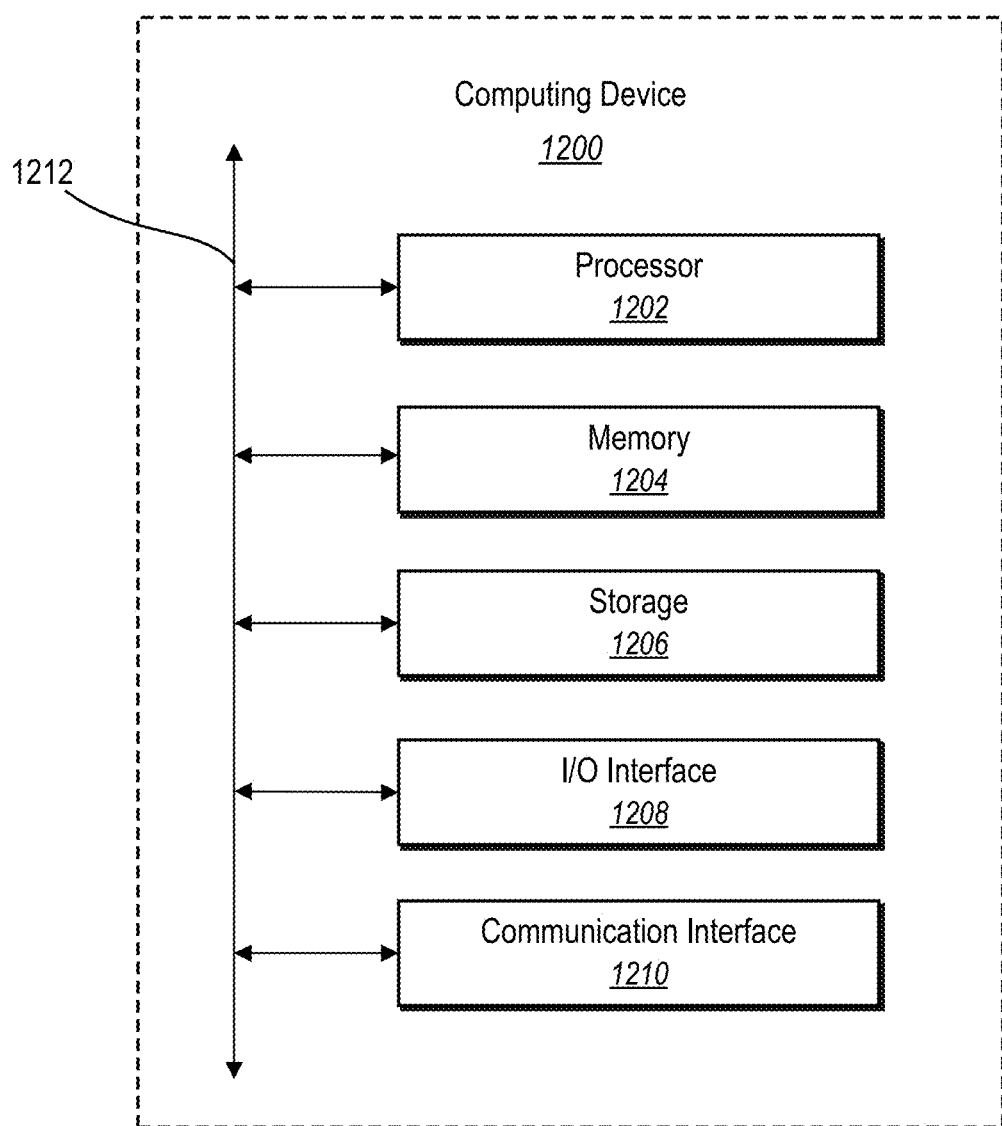
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as the computing device 1200 may implement the system(s) of FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   generate a synthesized digital image comprising one or more objects by utilizing an image synthesis neural network;
   determine one or more classes associated with the one or more objects of the synthesized digital image;
   select one or more class-specific generator neural networks based on the one or more classes associated with the one or more objects;
   crop the synthesized digital image to one or more bounding boxes corresponding to the one or more objects;
   crop a semantic label map associated with the synthesized digital image to one or more regions corresponding to the one or more objects;
   generate, utilizing the one or more bounding boxes and the one or more regions, one or more synthesized objects by utilizing the one or more class-specific generator neural networks according to the one or more classes associated with the one or more objects; and
   replace the one or more objects in the synthesized digital image with one or more synthesized objects.

2. The non-transitory computer readable storage medium as recited in claim 1, further comprising instructions that, when executed by at least one processor, cause the computing device to:
   determine the one or more classes associated with the one or more objects of the synthesized digital image by determining a first class associated with a first object and a second class associated with a second object;
   select the one or more class-specific generator neural networks by selecting a first class-specific generator neural network corresponding to the first class and a second class-specific generator neural network corresponding to the second class; and
   generate one or more synthesized object by utilizing the one or more class-specific generator neural networks according to the one or more classes associated with the one or more objects by generating a first synthesized object by utilizing the first class-specific generator neural network and a synthesized second object by utilizing the second class-specific generator neural network.

3. The non-transitory computer readable storage medium as recited in claim 2, further comprising instructions that, when executed by at least one processor, cause the computing device to replace the first object and the second object by:
   replacing the first object with the first synthesized object within the synthesized digital image;
   obtaining image context data for the second object based on the first synthesized object within the synthesized digital image; and
   replacing the second object with the synthesized second object within the synthesized digital image according to the image context data for the second object.

4. The non-transitory computer readable storage medium as recited in claim 1, further comprising instructions that, when executed by at least one processor, cause the computing device to generate the one or more synthesized objects by:
   generating a synthesized object utilizing a class-specific generator neural network corresponding to an object of the one or more objects.

5. The non-transitory computer readable storage medium as recited in claim 4, further comprising instructions that, when executed by at least one processor, cause the computing device to replace the one or more objects by inserting the synthesized object into the synthesized digital image at a position of the object of the one or more objects within the synthesized digital image.

6. The non-transitory computer readable storage medium as recited in claim 4, further comprising instructions that, when executed by at least one processor, cause the computing device to generate the synthesized object by utilizing the class-specific generator neural network based on image context data from image pixels proximate the object of the one or more objects within a bounding box corresponding to the object of the one or more objects.

7. The non-transitory computer readable storage medium as recited in claim 4, further comprising instructions that, when executed by at least one processor, cause the computing device to:
   crop the semantic label map to a region corresponding to a bounding box corresponding to the object of the one or more objects in the synthesized digital image, the semantic label map utilized to generate the synthesized digital image;
   generate a digital mask to mask the object out of the bounding box in the synthesized digital image; and
   generate the synthesized object by utilizing the class-specific generator neural network based on the region of the semantic label map and the bounding box with the object masked out of the bounding box according to the digital mask.

8. The non-transitory computer readable storage medium as recited in claim 1, further comprising instructions that, when executed by at least one processor, cause the computing device to replace the one or more objects in the synthesized digital image by:
   generating, utilizing an encoder of a class-specific generator neural network, a spatial feature tensor for an object of the one or more objects; and
   generating, utilizing a decoder of the class-specific generator neural network, a synthesized portion of the synthesized digital image based on the spatial feature tensor and image context data from a region of the synthesized digital image surrounding the object of the one or more objects.

9. The non-transitory computer readable storage medium as recited in claim 1, further comprising instructions that, when executed by at least one processor, cause the computing device to replace the one or more objects in the synthesized digital image by inserting the one or more objects into the synthesized digital image utilizing alpha blending.

10. A system comprising:
a memory device; and
one or more processors configured to cause the system to:
generate a synthesized digital image comprising one or more objects based on a semantic label map by utilizing an image synthesis neural network;
determine one or more classes associated with the one or more objects of the synthesized digital image according to on one or more labels for the one or more objects in the semantic label map;
select one or more class-specific generator neural networks based on the one or more classes associated with the one or more objects;
crop the synthesized digital image to one or more bounding boxes corresponding to the one or more objects;
crop the semantic label map associated with the synthesized digital image to one or more regions corresponding to the one or more objects; and
generate a modified synthesized digital image by:
generating, utilizing the one or more bounding boxes and the one or more regions, one or more synthesized objects utilizing the one or more class-specific generator neural networks according to the one or more classes associated with the one or more objects; and
inserting the one or more synthesized objects into the synthesized digital image.

11. The system as recited in claim 10, wherein the one or more processors are configured to cause the system to determine the one or more classes associated with the one or more objects by:
determining a first class associated with a first object of the one or more objects; and
determining a second class associated with a second object of the one or more objects, the first class being different than the second class.

12. The system as recited in claim 11, wherein the one or more processors are configured to cause the system to select the one or more class-specific generator neural networks by:
selecting a first class-specific generator neural network corresponding to the first class; and
selecting a second class-specific generator neural network corresponding to the second class, the first class-specific generator neural network being different than the second class-specific generator neural network.

13. The system as recited in claim 10, wherein the one or more processors are configured to cause the system to generate the one or more synthesized objects by:
cropping the synthesized digital image to first bounding box comprising a first pixel region surrounding a first object of the one or more objects and a second bounding box comprising a second pixel region surrounding a second object of the one or more objects;
cropping the semantic label map to a first region corresponding to a first position of the first object and a second region corresponding to a second position of the second object;
generating, utilizing a first class-specific generator neural network, a first synthesized object based on the first bounding box of the synthesized digital image and the first region of the semantic label map; and
generating, utilizing a second class-specific generator neural network, a second synthesized object based on the second bounding box of the synthesized digital image and the second region of the semantic label map.

14. The system as recited in claim 13, wherein the one or more processors are configured to cause the system to crop the synthesized digital image to the one or more bounding boxes by masking the first object out of the first bounding box and the second object out of the second bounding box.

15. The system as recited in claim 10, wherein the one or more processors are configured to cause the system to replace the one or more synthesized objects in the synthesized digital image by replacing the one or more objects of the synthesized digital image with the one or more synthesized objects at one or more positions of the one or more objects.

16. A method comprising:
determining, by at least one processor and from a semantic label map corresponding to a synthesized digital image, one or more classes associated with one or more objects of the synthesized digital image;
selecting, by the at least one processor, one or more class-specific generator neural networks corresponding to the one or more classes;
cropping the synthesized digital image to one or more bounding boxes corresponding to the one or more objects;
cropping a semantic label map associated with the synthesized digital image to one or more regions corresponding to the one or more objects; and
generating, by the at least one processor, a modified synthesized digital image by:
generating, utilizing the one or more bounding boxes and the one or more regions, one or more synthesized objects utilizing the one or more class-specific generator neural networks; and
inserting, by the at least one processor, the one or more synthesized objects into the synthesized digital image.

17. The method as recited in claim 16, wherein:
selecting the one or more class-specific generator neural networks comprises selecting a plurality of different class-specific generator neural networks corresponding to a plurality of different objects having different classes; and
generating the modified synthesized digital image further comprises:
generating a plurality of different synthesized objects utilizing the plurality of different class-specific generator neural networks; and
replacing the plurality of different objects with the plurality of different synthesized objects at a plurality of positions of the synthesized digital image.

18. The method as recited in claim 16, wherein generating the modified synthesized digital image comprises:
generating, utilizing a first class-specific generator neural network, a first synthesized object based on a first cropped portion of the synthesized digital image;
inserting the first synthesized object into the synthesized digital image;
generating, utilizing a second class-specific generator neural network, a second synthesized object based on a second cropped portion of the synthesized digital image, the second cropped portion comprising at least a portion of the first synthesized object; and
inserting the second synthesized object into the synthesized digital image.

19. The method as recited in claim 18, wherein generating the first synthesized object comprises:
- generating the first cropped portion of the synthesized digital image comprising a bounding box corresponding to a first object of the synthesized digital image;
- determining a mask to exclude the first object from the bounding box; and
- generating, utilizing the first class-specific generator neural network, the first synthesized object based on the bounding box excluding the first object.

20. The method as recited in claim 19, wherein generating the first synthesized object comprises:
- extracting a plurality of feature sets corresponding to the first object at a plurality of different resolutions;
- determining a spatial feature tensor for the first object by aggregating the plurality of feature sets at the plurality of different resolutions; and
- generating, utilizing the first class-specific generator neural network, the first synthesized object based on the spatial feature tensor.

\* \* \* \* \*